(12) United States Patent
Arguelles et al.

(10) Patent No.: US 10,061,689 B1
(45) Date of Patent: Aug. 28, 2018

(54) DISTRIBUTED SOFTWARE TESTING

(71) Applicant: Amazon Technologies, Inc., Seattle, WA (US)

(72) Inventors: Carlos Alejandro Arguelles, Shoreline, WA (US); David Robert Griffin, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/724,648

(22) Filed: Oct. 4, 2017

Related U.S. Application Data

(63) Continuation of application No. 14/857,252, filed on Sep. 17, 2015, now Pat. No. 9,811,451.

(51) Int. Cl.
    *G06F 9/44*      (2018.01)
    *G06F 11/36*      (2006.01)

(52) U.S. Cl.
    CPC ................. *G06F 11/3688* (2013.01)

(58) Field of Classification Search
None
See application file for complete search history.

(56) References Cited

U.S. PATENT DOCUMENTS

| | | |
|---|---|---|
| 8,769,102 B1 | 7/2014 | Zhou et al. |
| 2003/0098879 A1* | 5/2003 | Mathews ............ G06F 11/3688 715/762 |
| 2006/0025953 A1 | 2/2006 | Janes |

OTHER PUBLICATIONS

Office action for U.S. Appl. No. 14/857,252, dated Oct. 21, 2016, Arguelles et al., "Distributed Software Testing", 9 pages.
Office action for U.S. Appl. No. 14/857,252, dated Apr. 10, 2017, Arguelles et al., "Distributed Software Testing", 10 pages.

* cited by examiner

*Primary Examiner* — Chuck Kendall
(74) *Attorney, Agent, or Firm* — Lee & Hayes, PLLC

(57) ABSTRACT

Technologies are disclosed herein for distributed software testing. A software testing service is disclosed that can receive tests for software under test. The software testing service can determine a number of test instances to utilize to perform the tests. The determined number of test instances can then be provisioned, such as through the use of an on-demand computing service executing in a service provider network. The test instances can also be configured with the software under test and a test runner capable of performing the tests on the software. The software testing service can place the tests on a queue, such as a queue provided by a queue service. The test runners executing on the test instances can dequeue the tests and perform the tests on the software. Once the testing of the software under test has been completed, the test instances can be de-provisioned.

20 Claims, 11 Drawing Sheets

US 10,061,689 B1

DISTRIBUTED SOFTWARE TESTING

RELATED APPLICATIONS

This application claims priority to and is a continuation of U.S. patent application Ser. No. 14/857,252, filed on Sep. 17, 2015, the entire contents of which are incorporated herein by reference.

BACKGROUND

Thorough testing is one of the most important aspects of software development. In order to test complex software thoroughly, it is not unusual for a software developer to run thousands of tests, some of which might take hours or more to execute. If a software development team utilizes such tests to approve changes to the software, the extensive amount of time required to perform the tests might limit the team's ability to make a code change and have the change be deployed to a production environment in a timely manner. This can be frustrating for the software developers on the software development team.

As a result of the sometimes lengthy time required to perform software tests, some software development teams end up reducing the number of tests that are performed on the software. This means that code changes reach a production environment quicker. However, this also means that the risk that the software includes bugs is greater than if more thorough testing had been performed. A higher risk of deploying software containing bugs is unacceptable in many environments.

One solution to the problems described above is to utilize test platforms that allow for multithreaded execution of tests. Using such a platform, multiple tests can be executed concurrently in the same process. However, this solution often has its own limitations. For example, in order to perform multithreaded execution of tests, the test developer must write the tests in a way that ensures that the tests are safe for multithreaded execution. As a result, creating tests for multithreaded execution might require significant additional work by the software developer. Additionally, multithreaded execution only scales to the limits of the computing resources (e.g. CPU and memory) of the computer upon which they are executed. As a result, the benefits of multithreaded execution of tests might be limited.

The disclosure made herein is presented with respect to these and other considerations.

DETAILED DESCRIPTION

Figure 1:
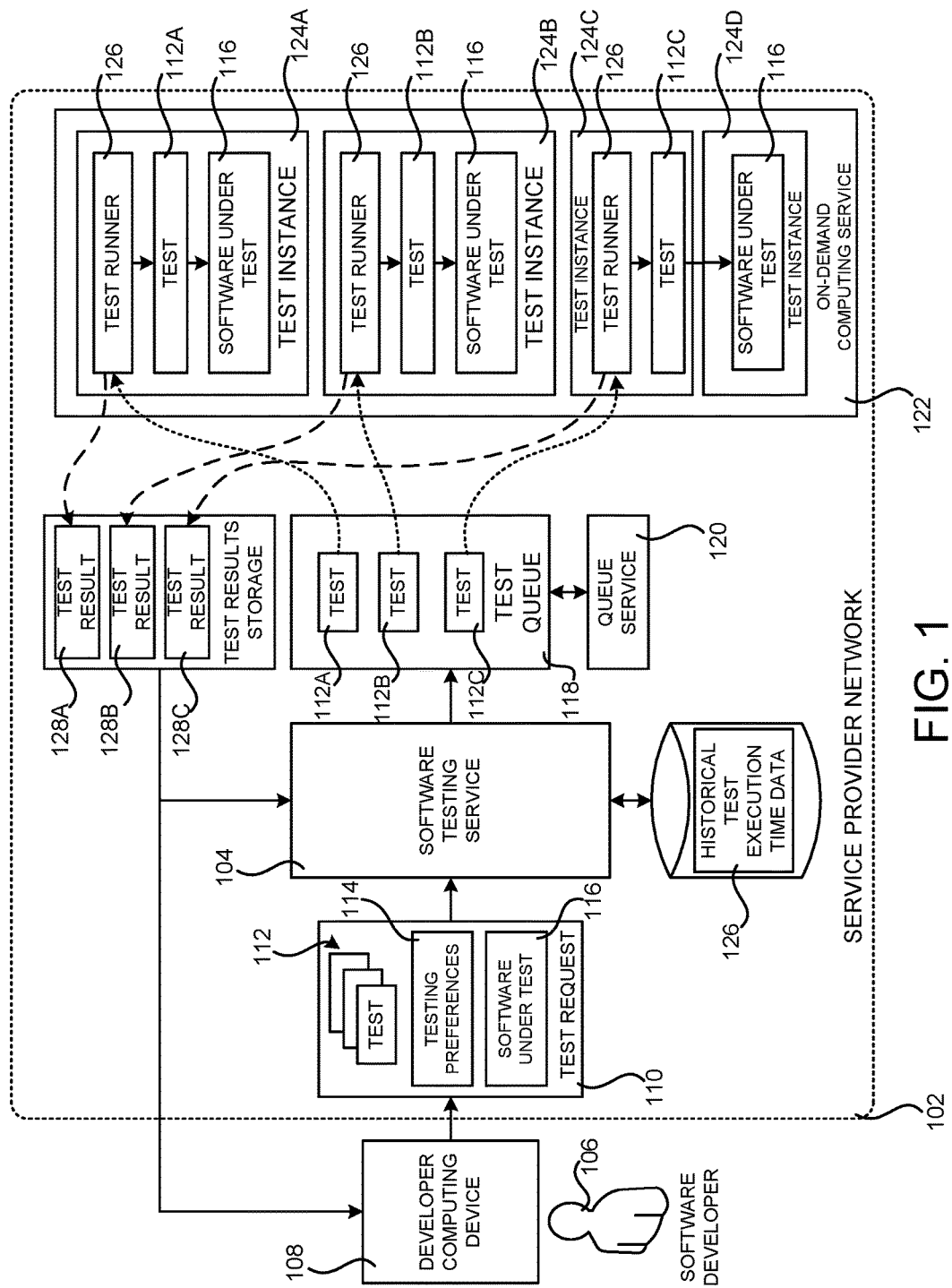
FIG. 1 is a system architecture diagram showing aspects of the configuration and operation of a service provider network that is configured to provide a software testing service, according to one configuration disclosed herein.

The following detailed description is directed to technologies for distributed software testing. Through an implementation of these technologies, developer-created tests for software can be distributed to a multitude of test instances for execution in parallel. By executing software tests in parallel in this manner, the amount of time required to execute the tests can be reduced as compared to non-parallelized execution. Moreover, by executing software tests in parallel, the extensive testing needed to ensure high quality software can be performed while, at the same time, allowing the software to be deployed to a production environment in a timely manner. Additionally, the technologies disclosed herein enable the parallel execution of tests for software without requiring that the software developer modify their existing tests in any way. Additional technical benefits other than those described briefly above can also be realized through an implementation of the technologies disclosed herein.

In order to enable the functionality disclosed herein, a software testing service is provided in one configuration. The software testing service is a network service that can execute in a service provider network that permits customers to purchase and utilize computing resources (which might be referred to herein simply as "resources") such as virtual machine ("VM") instances, data storage resources, database resources, networking resources, network services, and other types of computing resources on demand. The computing resources are provided by network services executing in the service provider network. For example, and without limitation, an on-demand computing service executing in a service provider network can be configured to provide computing resources such as VM instances on an as-needed basis. Other services can also provide other types of computing resources on an as-needed basis.

The software testing service disclosed herein is configured to receive a request to perform tests on software (which might be referred to herein as "software under test"). The request can include the software or a reference to the software, the tests or references to the tests and, potentially, one or more testing preferences. The request might, for example, be generated and submitted to the software testing service by a software developer of the software under test.

The developer-specified testing preferences can define various preferences regarding how the tests are to be distributed to test instances for execution in parallel. For example, and without limitation, the testing preferences might explicitly specify the number of test instances to utilize for performing the tests on the software. As another example, the testing preferences might specify a maximum execution time for the tests. In this scenario, the number of test instances to utilize to complete testing approximately within the maximum execution time can be determined based upon historical test execution time data for the tests. Alternately, if historical test execution time data is not available for the tests, the number of test instances to utilize to complete testing within approximately the maximum execution time can be determined based upon historical test execution time data for other tests that are similar to the tests to be performed. The testing preferences might also specify other or alternate preferences regarding the manner in which the tests are to be performed.

Once the number of test instances to utilize for testing has been determined, the software testing service can cause the test instances to be provisioned. For example, in one configuration, the software testing service can utilize an on-demand computing service executing in the service provider network to provision the test instances. The test instances can be VM instances, software containers, dedicated server computers, or other types of software execution environments suitable for executing tests on software under test. Once the test instances have been provisioned, the software under test and a test runner can be deployed to the test instances. The test runner is executable software configured to obtain tests, perform the tests on the software under test, and to provide the results of the tests.

In one particular configuration, the software testing service is configured to utilize a queue provided by a queue service executing in the service provider network to provide the tests to the test runner executing on the test instances. For example, the software testing service may place the tests, or messages including references to the tests, on such a queue. The test runner executing on the test instances can dequeue the tests from the queue and perform the tests on the software under test. The test runner will continue dequeue-ing tests and executing the tests until no further tests remain on the queue.

The software testing service can also determine whether all of the tests have completed. If all of the tests of the software under test have completed, the test instances can then be de-provisioned. For example, and without limitation, the on-demand computing service executing in the service provider network might be instructed to de-provision the test instances. In this way, the test instances are only utilized during testing and can be destroyed once testing has completed.

In some configurations, the number of test instances utilized for testing can be dynamically increased or decreased during testing. For example, and without limitation, the software testing service can be configured to compute an estimated amount of time for completion of the tests. The software testing service can also determine whether the estimated amount of time for completion of the tests is greater than or less than a desired (e.g. developer-specified) amount of time for completing the tests.

If the estimated time for completion of the tests is less than the desired amount of time for completion (i.e. the tests will complete sooner than desired), then one or more of the test instances can be de-provisioned. If, however, the estimated time for completion of the tests is greater than the desired amount of time for completion (i.e. the tests will complete later than desired), then additional test instances can be provisioned and configured in the manner described above. In this way, the number of test instances can be dynamically optimized during testing in order to complete a suite of tests approximately within a specified amount of time.

In another configuration, the software testing service is configured to operate in conjunction with a static fleet of test instances. In this configuration, the number of available test instances is fixed and cannot be modified dynamically as in the configuration described above. Additionally, in this configuration the software testing service can be configured to distribute tests for multiple different service clients (e.g. customers) to the fixed number of test instances. For example, and without limitation, the software testing service might receive requests from multiple service clients to perform tests on different software.

Utilizing one or more heuristics, the software testing service can select a subset of the tests for one of the service clients and a subset of the tests for another of the service clients. The selected subsets of the tests can then be made available to a test runner executing on the test instances in the static fleet. Once the tests have been completed, the heuristics might be utilized to select another subset of the tests, which are then made available to the test runners and performed on the software under test. This process can continue until no further tests remain to be performed.

The heuristics utilized to select subsets of the tests for performance on the software under test can include, but are not limited to, a priority associated with the tests, a desired completion time for the tests, and an estimated time for completion of the tests. Other heuristics might also or alternately be utilized in other configurations. Additional details regarding the various components and processes described briefly above for distributed software testing will be presented below with regard to FIGS. 1-11.

It should be appreciated that the subject matter presented herein can be implemented as a computer process, a computer-controlled apparatus, a computing system, or an article of manufacture, such as a computer-readable storage medium. While the subject matter described herein is presented in the general context of software modules that execute on one or more computing devices, those skilled in the art will recognize that other implementations can be performed in combination with other types of software modules. Generally, software modules include routines, programs, components, data structures, and other types of structures that perform particular tasks or implement particular abstract data types.

Those skilled in the art will also appreciate that aspects of the subject matter described herein can be practiced on or in conjunction with other computer system configurations beyond those described herein, including multiprocessor systems, microprocessor-based or programmable consumer electronics, minicomputers, mainframe computers, hand-held computers, personal digital assistants, e-readers, mobile telephone devices, tablet computing devices, special-purposed hardware devices, network appliances, and the like. As mentioned briefly above, the configurations described herein can be practiced in distributed computing environments, such as a service provider network, where tasks can be performed by remote computing devices that are linked through a communications network. In a distributed computing environment, program modules can be located in both local and remote memory storage devices.

In the following detailed description, references are made to the accompanying drawings that form a part hereof, and that show, by way of illustration, specific configurations or examples. The drawings herein are not drawn to scale. Like numerals represent like elements throughout the several figures (which might be referred to herein as a "FIG." or "FIGS.").

FIG. 1 is a system architecture diagram showing aspects of the configuration and operation of a service provider network 102 that is configured to provide functionality for distributed software testing. As discussed briefly above, the service provider network 102 is a distributed network through which customers and/or other users can utilize computing resources (which might be referred to herein simply as "resources"), such as VM instances and/or other types of computing resources, on a permanent or as-needed basis.

Each type or configuration of a computing resource can be available from the service provider network 102 in different sizes. For example, a service provider might offer physical hosts, VM instances or other types of data processing resources that are available for purchase and use that have many different configurations of processor capabilities, main memory, disk storage, and operating system. A service provider operating the service provider network 102 might also offer other types of computing resources for purchase and use by customers. For example, a service provider might offer virtual or hardware devices, database resources and instances, file or block data storage resources, and/or networking resources, such as load balancing resources, domain name service ("DNS") resources, virtual private cloud ("VPC") resources, virtual local area network ("VLAN") resources, and/or other types of hardware and software computing resources or services on a permanent or as-needed basis. The computing resources might also include, but are not limited to, VM instances and images, security groups, option groups, gateways, option sets, network access control lists ("ACLs"), subnets, storage buckets, network interfaces, queues, snapshots, spot market requests, and storage volumes.

The service provider operating the service provider network 102 might also charge a fee for utilization of the computing resources to a customer that creates and uses the resources. The fee charged for a particular computing resource might be based upon the type and/or configuration of the computing resource. For example, in the case of a data processing computing resource, like a VM instance, the fee for use of the computing resource might be charged based upon the amount of time the computing resource is utilized. In the case of a data storage computing resource, the fee might be computed based upon the amount of data stored and/or the amount of data transferred into or out of the computing resource. The fees for other types of resources might also be based upon other considerations. A service provider might also utilize various purchasing models to determine the amount to charge a customer for use of resources provided by the service provider network 102.

The resources described above can be provided in one particular implementation by one or more data centers operated by the service provider. As known to those skilled in the art, data centers are facilities utilized to house and operate computer systems and associated components. Data centers also typically include redundant and backup power, communications, cooling, and security systems. The data centers might be located in geographically disparate regions, and might also be connected to various other facilities, such as co-location facilities, and various wide area networks ("WANs"), such as the Internet. Additional details regarding the configuration and operation of a data center for implementing the functionality disclosed herein are provided below with regard to FIG. 9.

The resources described briefly above might also be provisioned and de-provisioned as needed in an automated fashion. For example, the service provider network 102 might be configured to create a new instance of a computing resource, such as a VM instance, in response to an increase in demand for a network service or other condition. Other types of computing resources might also be provisioned and de-provisioned in a similar manner. Services in the service provider network 102 might also provide functionality for automatically scaling and/or de-scaling resources based upon demand for the resources and/or other factors.

A customer or potential customer of the service provider network 102 might utilize an appropriate computing system, such as the developer computing device 108, to communicate with the service provider network 102 over an appropriate data communications network (not shown in FIG. 1). In this way, a customer of the service provider network 102 can configure various aspects of the operation of the computing resources provided by the service provider network 102, or to otherwise control any computing resources being utilized by the customer.

For example, and without limitation, a computing system utilized by a customer of the service provider network 102, such as the developer computing device 108, might be utilized to purchase computing resources in the service provider network 102, to configure aspects of the operation of the computing resources through a management console (not shown in FIG. 1) or other type of interface, to access and utilize functionality provided by the various services and systems described herein, and/or to perform other types of functionality with regard to the operation of the computing resources provided by the service provider network 102.

The developer computing device 108 might be any type of computing device capable of connecting to the service provider network 102 via a suitable data communications network such as, but not limited to, a laptop or desktop computer, a tablet computing device, a server computer, or a smartphone. Administrative users employed by the operator of the service provider network 102, such as administrators managing the operation of the service provider network 102, might also connect with, manage, and utilize resources provided by the service provider network 102 in a similar fashion.

As discussed briefly above, the service provider network 102 might also be configured to execute various types of network services to provide the computing resources 108. For example, and without limitation, the service provider network 102 can provide an on-demand computing service 122 (described in greater detail below) for providing VM instances or other types of processing resources on-demand, a queue service 120, a data storage service (not shown in FIG. 1) for providing data storage resources and, potentially, other types of network-accessible services for providing other types of computing resources. These and other network services and their associated computing resources can be utilized together to implement various types of network-based applications in the service provider network 102.

As discussed briefly above, a software testing service 104 also executes in the service provider network 104 in one configuration. The software testing service 104 is configured to receive a request (e.g. the test request 110 shown in FIG. 1) to perform tests 112 on software 116 (which might be referred to herein as a "software under test"). The test request 110 can include the software 116 or a reference to the software 116 to be tested, the tests 112 or references to the tests 112 and, potentially, one or more testing preferences 114. The test request 110 might, for example, be generated and submitted to the software testing service 104 by a software developer 106 of the software 116 under test. Other services in the service provider network 102 can also submit test requests 110 to the software testing service 104.

The tests 112 are software components that are configured to test various aspects of the operation of the software 116 under test. For example, and without limitation, the tests 112 can include unit tests that are configured to tests functional areas of the software 116. Other types of tests 112 can also be defined. The tests 112 can be defined utilizing existing testing frameworks. For example, and without limitation, the tests 112 can be defined utilizing the JUNIT or TESTNG testing frameworks. Other frameworks can also be utilized. By utilizing tests 112 that are compatible with existing testing frameworks, the software developer 106 is not required to create new tests 112 that are compatible with the software testing service 104 disclosed herein.

The tests 112 can also be defined as encompassing multiple distinct tests. In this way, multiple tests 112 that need to be executed sequentially on the same test instance 124 (which might be referred to herein as the "smallest execution unit") can be defined. Industry standard testing frameworks, such as JUNIT and TESTNG, provide functionality for modeling dependencies between individual tests 112. The software testing service 104 understands and respects these dependencies. For example, and without limitation, the software developer 106 can specify that a first test 112 depends upon a second test 112. This might be true when first test 112 creates data that the second test 112 uses or when the second test 112 is only to be executed when the first test 112 passes. In either case, the software testing service 104 understands that both the first test 112 and the second test 112 cannot be executed independently or in parallel. Rather, both tests 112 need to be executed sequentially on the same test instance 124. In order to enable this functionality, the software testing service 104 will group the first test and the second test for execution on a single test instance 124.

In this regard, it should be appreciated that various mechanisms can be utilized to model the smallest execution unit. In the case of the JAVA programming language, for example, a JAVA class or a JAVA package can be defined as the smallest execution unit. Industry standard frameworks such as TESTNG and JUNIT also support the concept of "suites", typically by adding JAVA annotations on a test 112 to indicate the suite to which it belongs. Other mechanisms can also be utilized to model the smallest execution unit in other configurations.

As mentioned briefly above, the test request 110 can also specify testing preferences 114. The testing preferences 114 can define various preferences regarding how the tests 112 are to be distributed to test instances 124 for execution in parallel. For example, and without limitation, the testing preferences 114 might explicitly specify the number of test instances 124 to utilize for performing the tests 112 on the software 116. As another example, the testing preferences 114 might specify a maximum execution time for the tests 112. In this scenario, the number of test instances 124 to utilize to complete execution of the tests 112 approximately within the specified maximum execution time can be determined based upon historical test execution time data 126 for the tests 112. The historical test execution time data 126 describes the average time taken to execute the tests 112 during previous testing.

It should be appreciated that the testing preferences 114 described above are merely illustrative. Accordingly, the testing preferences 114 might also specify other or alternate preferences regarding the manner in which the tests 112 are to be performed. For example, and without limitation, the testing preferences 114 might specify the type of test instances 124 to be used, a maximum cost to be incurred for executing the tests 112, and/or other information.

In order to compute the number of test instances 124 to utilize based on the historical test execution time data 126 for the tests 112, the software testing service 104 utilizes the historical test execution time for a test 112 as an estimate of how long the test 112 will take to run again. When the execution time for a test 112 changes, the software testing service 104 can readjust the estimated time for execution utilizing a mechanism whereby weights are assigned to execution times. In particular, a window of N executions of a test 112 might be utilized, and more recent executions of the test 112 will be assigned a higher weight than older executions. Other mechanisms might also be utilized.

If historical test execution time data is not available for the tests 112, the number of test instances 124 to utilize to complete executing of the tests 112 within approximately the specified maximum execution time can be determined based upon historical test execution time data for other tests that are similar to the tests 112 to be performed. For example, and without limitation, the other tests might be tests in the same class, package, or archive. In this example, historical execution times for tests in the same class might be given a greater weight than tests in the same package. Similarly, historical execution times for tests in the same package might be assigned a greater weight than the historical execution times of tests in the same archive. In this manner, the historical execution times for other tests can be assigned a weight that is based upon their relevance to the tests 112 to be performed. Other mechanisms can also be utilized to estimate the time to complete the tests 112 from historical execution times of other tests.

Utilizing the historical test execution time data 126 for the tests 112, or for other similar tests, the software testing service 104 can compute an estimate of the amount of time it will take to execute the tests 112 sequentially and approximately how long it will take to run the tests 112 in parallel on N test instances 124. Likewise, the software testing service 104 can compute how many test instances 124 it would take to execute the tests 112 in M minutes. For example, and without limitation, if the tests 112 have historically taken approximately three hours to execute, it would require three test instances 124 to perform the tests 112 in one hour. Likewise, if the tests 112 were executed on ten test instances 124, it would take approximately eighteen minutes to execute the tests 112. Additional details regarding one mechanism disclosed herein for determining the number of test instances 124 to utilize for testing will be provided below with regard to FIG. 3.

Once the software testing service 104 has computed the number of test instances 124 to utilize for testing, the software testing service 104 can cause the test instances 124 to be provisioned. For example, in one configuration, the software testing service 104 can utilize an on-demand computing service 122 executing in the service provider network 102 to provision the identified number of test instances 124. As discussed briefly above, the test instances 124 can be VM instances, software containers, dedicated server computers, or other types of software execution environments suitable for executing tests on a software 116 under test. In the example shown in FIG. 1, the software testing service 104 has instructed the on-demand computing service 122 to provision three test instances 124A-124C. In this regard, it should be appreciated that fewer or more test instances 124 might also be utilized than shown in FIG. 1.

Once the test instances 124 to be utilized for testing the software 116 have been provisioned, the software 116 under test and a test runner 126 can be deployed to the provisioned test instances 124. As discussed briefly above, the test runner 126 is executable software configured to obtain the tests 112, perform the tests 112 on the software 116 under test, and to provide the results of the tests 112. Each of these operations is described in greater detail below. In this regard, it should be appreciated that the test runner 126 might be configured to execute tests 112 that have been created in accordance with a particular testing framework. For example, and without limitation, the test runner 126 can be configured to perform tests 112 that have been created in accordance with the JUNIT or TESTNG testing frameworks. The test runner 126 might also be compatible with tests 112 that are compatible with other testing frameworks in other configurations.

It should also be appreciated that the software under test can be present on the same test instance 124 as the test runner 126 or can be installed on a different instance 124. For instance, in the example shown in FIG. 1, the software under test is present on the instances 124A-124B. This configuration might be appropriate where the tests 112 are unit test, for example. The software under test has also been installed on a separate test instance 124D for testing by the test runner 126 executing on the test instance 126C. This configuration might be appropriate where the tests 112 are integration or performance tests. Other types of tests 112 and configurations can also be utilized.

In one particular configuration, the software testing service 104 is configured to utilize a distributed queue 118 provided by a queue service 120 executing in the service provider network 102 to provide the tests 112 (or references to the tests 112) to the test runner 126 executing on the test instances 124. For example, the software testing service 104 may place the tests 112, or messages including references to the tests 122, on such a queue 118. The test runner 126 executing on the test instances 124 can dequeue the tests from the queue 118 and perform the tests 112 on the software under test 116. In the example shown in FIG. 1, for instance, the software testing service 104 has placed the tests 112A-112C on the test queue 118. The test runner 126 executing on the test instance 124A has dequeued and executed the test 112A. Similarly, the test runner 126 executing on the test instance 124B has dequeued and executed the test 112C. Likewise, the test runner 126 executing on the test instance 124C has dequeued and executed the test 112C. The test runner 126 will continue dequeueing tests 112 and executing the tests 112 until no further tests 112 (or references to tests) remain on the queue 118.

The test runner 126 is also configured to store test results 128 in an appropriate location, such as a database, a network storage location, another queue, or in another appropriate data store. For instance, in the example shown in FIG. 1, the test runner 126 executing on the test instance 124A has generated and stored the test result 128A, the test runner 126 executing on the test instance 124B has generated and stored the test result 128B, and the test runner 126 executing on the test instance 124C has generated the test result 128C. The software developer 106 can utilize the developer computing device 108 to access and examine the test results 128. Additional details regarding the operation of the test runner 126 will be provided below with regard to FIG. 4.

The test results 128 might also be provided to the software testing service 104. In some configurations, the test results 128 include various tops of logs and/or other types of data describing aspects of the execution of the tests 112. The test results 128 can also include data indicating the time of execution of the corresponding test 112. Utilizing this data, the software testing service 104 can update the historical test execution time data 126. For example, the software testing service 104 can store data identifying the test 112 that was executed, the amount of time taken to execute the test, the class or other functional unit of tested software, and/or other data describing other aspects of the execution of the test 126. As discussed above, this data can be utilize to estimate the time to execute the tests 112 or other tests.

The software testing service 104 can also determine whether all of the tests 112 have completed. For example, and without limitation, the software testing service 104 might examine the test queue 118 or the test results 128 to determine if all of the tests have completed. Alternately, the test runner 126 can provide other types of notifications to the software testing service 104 including, but not limited to, status messages and messages indicating that tests 112 have completed.

If all of the requested tests 112 of the software 116 under test have completed, the test instances 124 utilized for testing can be de-provisioned. For example, and without limitation, the software testing service 104 can instruct the on-demand computing service 122 executing in the service provider network 102 to de-provision the test instances 124. In this way, the test instances 124 are only utilized during testing and can be destroyed once testing of the software 116 under test has completed. Additional details regarding the operation of the software testing service 104 will be provided below with regard to FIG. 2.

In some configurations, the number of test instances 124 utilized for testing can be dynamically increased or decreased during testing. For example, and without limitation, the software testing service 104 can be configured to compute an estimated amount of time for completion of the tests 112. The estimated amount of time for completion of the tests 112 can be computed based upon data indicating the tests 112 that have already been executed, the estimated execution time for the tests 112 that remain to be executed, and the estimated execution time for tests 112 that are currently executing. The test runner 126 can provide some or all of this data to the software testing service 104.

Using the data described above, the software testing service 104 can also determine whether the estimated amount of time for completion of the tests 112 is greater than or less than a desired (e.g. an amount of time specified by the software developer 106) amount of time for completing the tests 112. If the estimated time for completion of the tests 112 is less than the desired amount of time for completion (i.e. the tests 112 will complete sooner than desired), then one or more of the test instances 124 can be de-provisioned by sending a message to the on-demand computing service 122.

If, however, the estimated time for completion of the tests 112 is greater than the desired amount of time for completion (i.e. the tests 112 will complete later than desired), then additional test instances 124 can be provisioned and configured in the manner described above. In this way, the number of test instances 124 can be dynamically optimized during testing in order to complete a suite of tests 112 approximately within a specified amount of time. Additional details regarding the mechanism described above for dynamically adjusting the number of test instances 124 during test execution will be provided below with regard to FIG. 5.

In some configurations, the test runner 126 can be configured to execute on multiple processor threads on each test instance 124. In this implementation, the test runner 126 executing on each thread can independently dequeue and execute tests 112. For instance, if the test runner 126 is executed on N threads on a test instance 124, then N tests 112 can be dequeued and executed at a time. Similarly, multiple test runners 126 can be executed in different processes. For example, M processes can be spawned to thereby perform M tests 112 concurrently. Both multithreading and multi-process execution can also be utilized concurrently, to thereby perform M*N tests 112 concurrently. Other configurations can also be utilized.

In other configurations, the software testing service 104 can also receive metrics from the test runner 126. For example, the test runner 126 can provide information regarding the CPU usage, memory usage, thread count, and/or other metrics for the test instances 124. Based on this information, the software testing service 104 can instruct the test runner 126 to dynamically adjust the concurrent execution of the test runner 126 (e.g. multithreaded or multi process execution as described above) based upon whether the test instances 124 are being under-utilized or not. Additionally, in other configurations this information can be utilized to select different types of test instances 124 based upon the execution of the tests 112. For example, and without limitation, a test instance 126 with a greater amount of memory might be selected for future execution of the tests 112 if the tests 112 are memory bound. Similarly, a test instance 126 with a higher capacity CPU might be selected for future execution of the tests 112 if the tests 112 are CPU bound. Likewise, a test instance 126 with a greater amount of network bandwidth might be selected for future execution of the tests 112 if the tests 112 are bandwidth bound. Other mechanisms can also be utilized to select different types of tests instances 124 for performing the tests 112.

In yet other configurations, the software testing service 104 is configured to operate in conjunction with a static fleet of test instances 124. In this configuration, the number of available test instances 124 is fixed and cannot be modified dynamically as in the configuration described above. Additionally, in this configuration the software testing service 104 can be configured to distribute tests 112 for multiple different service clients (e.g. customers) to the fixed number of test instances 112. For example, and without limitation, the software testing service 104 might receive requests from multiple service clients (not shown in FIG. 1) to perform tests on different software 116.

Utilizing one or more heuristics, the software testing service 104 can select a subset of the tests 112 for one of the service clients and a subset of the tests 112 for another of the service clients. The selected subsets of the tests 112 can then be made available to a test runner 126 executing on the test instances 124 in the static fleet. Once the tests 112 have been completed, the heuristics might be utilized to select another subset of the tests 112, which are then made available to the test runners 126 and performed on the software 116 under test. This process can continue until no further tests 112 remain to be performed for any of the clients.

The heuristics utilized to select subsets of the tests 112 for performance on the software 116 under test can include, but are not limited to, a priority associated with the tests 112, a desired completion time for the tests 112, and an estimated time for completion of the tests 112. Other heuristics might also or alternately be utilized in other configurations. Additional details regarding this configuration of the software testing service 104 will be provided below with regard to FIGS. 6 and 7.

It should be appreciated that the on-demand computing service 122 can provide different instance types for instantiating the test instances 124. For example, and without limitation, the test instances 124 provided by the service provider network 102 may be on-demand instances, reserved instances, spot instances, or standby instances 1010. Other types of instances not specifically described herein might also be utilized to implement the functionality disclosed herein.

O-demand instances, which might also be referred to herein as "regular" instances, are instances that are paid for and in active use. On-demand instances allow customers of the service provider network 102, such as the developer 109, to pay for capacity per unit of time, such as an instance-hour, without requiring a long-term commitment. This frees the customer from the costs and complexities of planning, purchasing, and maintaining hardware and transforms what are commonly large fixed costs into much smaller variable costs.

Reserved instances are instances of a computing resource that are reserved in exchange for a payment. Reserved instances provide the customer the option to make a one-time payment for each instance they want to reserve. In turn, the customer may receive a significant discount on the hourly usage charge for the reserved instances as compared to on-demand instances. After a customer makes a one-time payment for the reserved instances, the reserved instances are reserved for the customer and the customer has no further obligation. The customer may choose to run the reserved instances for the discounted usage rate for the duration of a chosen term. If the customer does not use the reserved instances, the customer will not pay usage charges on these instances.

Spot instances allow customers to bid on unused capacity in the on-demand computing network 122. The customer can run the spot instances for as long as their bid exceeds a current market price, which might be referred to herein as the "spot instance market price." The spot instance market price can fluctuate based upon supply and demand. Spot instances may be terminated if a customer's maximum bid no longer exceeds the current spot instance market price.

In order to obtain spot instances, the customer places a request for the spot instances that specifies the desired number of spot instances and the maximum price the customer is willing to pay per instance hour. If the customer's maximum price bid exceeds the current spot instance market price for the spot instances, the customer's request will be fulfilled and the customer's spot instances will run until either the customer chooses to terminate them or the market price increases above the customer's maximum price (whichever is sooner). Various components operating within the on-demand computing service 122 and/or the service provider network 102 may manage the market for the spot instances, including setting the current spot instance market price for the spot instances.

Standby instances are spot instances that have been acquired on behalf of a customer and that are made ready for near immediate use by the customer in the manner described herein. The price charged for the standby instances is typically less than the price charged for the on-demand instances, since the standby instances may be terminated in the same manner as the spot instances. In one configuration, the standby instances are priced higher than the spot instances and the reserved instances, but lower than the on-demand instances. It should be appreciated, however, that the various pricing mechanisms described above for the on-demand instances, reserved instances, spot instances, and standby instances are merely illustrative and that other mechanisms may be utilized to set the pricing for the various instance types.

It should be appreciated that, in various configurations, the software testing service 104 can utilize various combinations of the instance types described above to execute the tests 112. For example, and without limitation, the software testing service 104 can execute tests on the various instance types in order to benchmark aspects of their performance. Based upon these benchmarks, the most appropriate instance type, or types, for executing certain tests 112 can be selected. Other mechanisms can also be utilized to select a particular instance type for executing a particular test 112.

Figure 2:
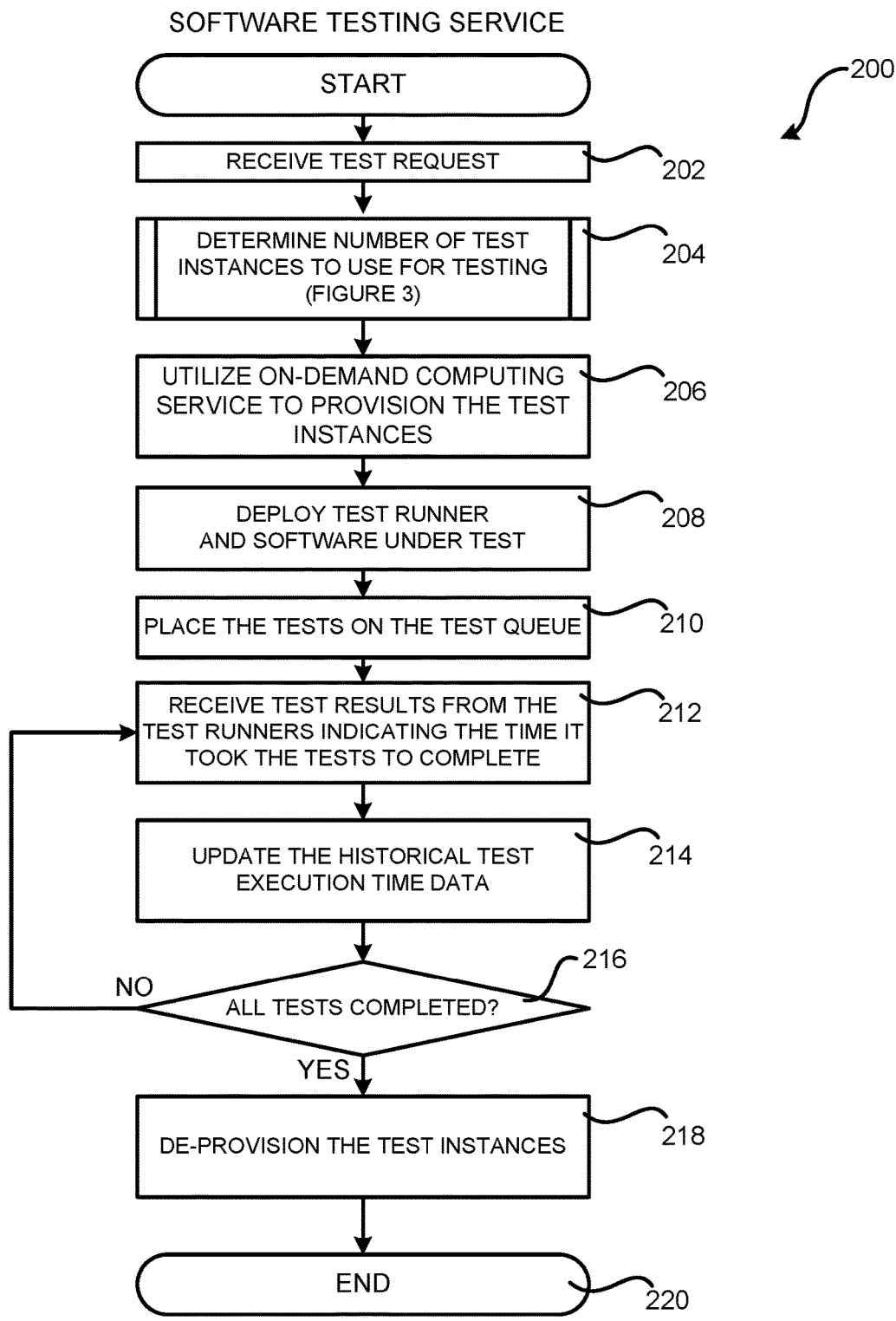
FIG. 2 is a flow diagram showing a routine that illustrates aspects of the operation of the software testing service shown in FIG. 1, according to one particular configuration disclosed herein.

FIG. 2 is a flow diagram showing a routine 200 that illustrates aspects of the operation of the software testing service 104 shown in FIG. 1, according to one particular configuration disclosed herein. It should be appreciated that the logical operations described herein with respect to FIG. 2, and the other FIGS., can be implemented (1) as a sequence of computer implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations can be performed than shown in the FIGS. and described herein. These operations can also be performed in parallel, or in a different order than those described herein. Some or all of these operations might also be performed by components other than those specifically identified.

The routine 200 begins at operation 202, where the software testing service 104 receives a test request 110. As discussed above, the test request 110 can include or provide a reference to the tests 112, include or provide a reference to the software 116 under test, and specify the testing preferences 112. As also discussed above, the testing preferences 112 can explicitly specify the number of test instances 124 to utilize for performing the tests 112 on the software 116 under test. As another example, the testing preferences might specify a maximum execution time for the tests 112. The testing preferences 114 can provide data defining other aspects of the manner in which the tests 112 are to be executed in other configurations.

From operation 202, the routine 200 proceeds to operation 204, where the software testing service 104 determines the number of tests instances 124 to utilize for performing the tests 112. Additional details regarding this process will be provided below with regard to FIG. 3. From operation 202, the routine 200 proceeds to operation 206.

At operation 206, the software testing service 104 causes the number of test instances 124 determined at operation 204 to be provisioned. For instance, in one particular configuration, the software testing service 104 transmits an instruction to the on-demand computing service 122 to provision the test instances 124. Once the test instances 124 have been provisioned, the routine 200 proceeds to operation 208, where the test runner 126 and the software 116 under test are deployed to the test instances 124. Other services, such as a software deployment service, executing within the service provider network 102 can be utilized to perform the deployment of the test runner 126 and the software 116 under test.

From operation 208, the routine 200 proceeds to operation 210, where the software testing service 104 places the tests 112 on the test queue 118 in one particular configuration. In other configurations, the tests 112 might be placed in another type of location, such as within a database or in a network storage location, for retrieval by the test runner 126. In other configurations, the tests 112 can be placed on the test queue 118 prior to or in parallel with the provisioning of the test instances 124. In other configurations, the tests 112 can be placed on the test queue 118 and dequeued at a future point in time based upon the spot instance market price, which was described above. Other configurations can also be utilized.

As discussed above, and in further detail below with regard to FIG. 4, the test runner 126 dequeues and executes the tests 112. The test runner 126 then places the test results 128 in an appropriate storage location for retrieval by the software developer 106 and the software testing service 104. As discussed above, the test results 128 can identify the particular test 112 that was executed and describe the amount of time required to perform the test 112. The test results 128 can also include other types of data.

From operation 210, the routine 200 proceeds to operation 212, where the software testing service 104 receives the test results 128 from the test runner 126. As discussed above, the test results 128 can include data indicating the time it took to execute the tests 112. This information is utilized to update the historical test execution time data 126 at operation 214. For example, and without limitation, data indicating the average execution time for a particular test 112 can be generated and stored.

From operation 214, the routine 200 proceeds to operation 216, where the software testing service 104 determines whether all of the requested tests 112 have completed. If the tests 112 have not yet completed, the routine 200 proceeds back to operation 212, where addition test results 128 can be received and the corresponding historical test execution time data 126 can be updated. If, however, all of the tests 112 have been completed, the routine 200 proceeds from operation 216 to operation 218.

At operation 218, the software testing service 104 causes the test instances 124 that were provisioned at operation 206 to be de-provisioned. For example, and without limitation, the software testing service 104 can transmit an instruction to the on-demand computing service 122 via an appropriate network services API to de-provision the test instances 124. Once the test instances 124 have been de-provisioned, the routine 300 proceeds from operation 218 to operation 220, where it ends.

Figure 3:
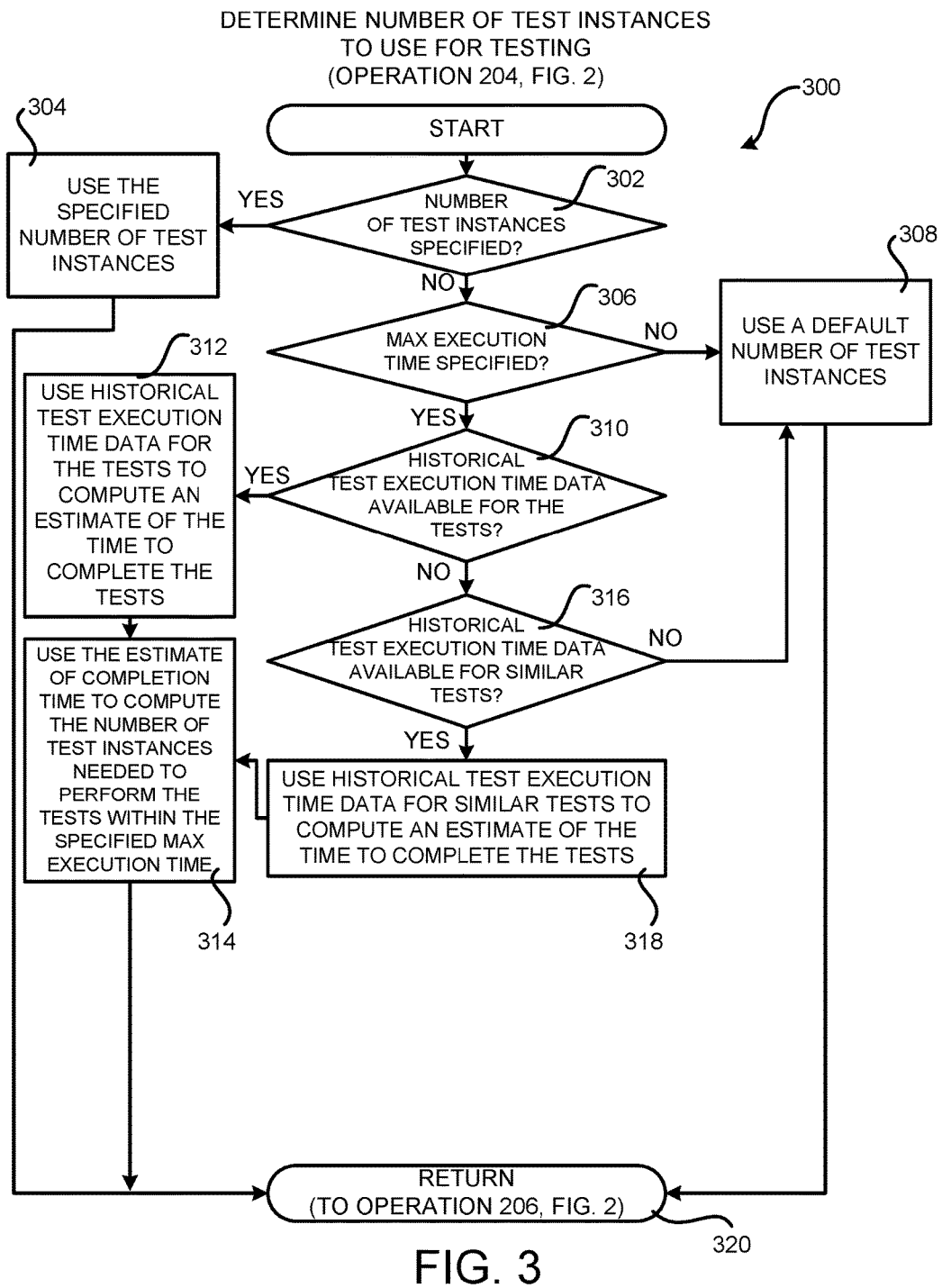
FIG. 3 is a flow diagram showing a routine that illustrates aspects of the operation of the software testing service shown in FIG. 1 for determining a number of test instances to utilize for testing, according to one particular configuration disclosed herein.

FIG. 3 is a flow diagram showing a routine 300 that illustrates aspects of the operation of the software testing service 104 shown in FIG. 1 for determining a number of test instances 124 to utilize for testing, according to one particular configuration disclosed herein. The routine 300 begins at operation 302, where the software testing service 104 determines whether the testing preferences 114 specify the number of test instances 124 to use for testing. If so, the routine 300 proceeds from operation 302 to operation 302, where the number of test instances 124 specified in the testing preferences 114 are utilized for testing. The routine 300 then proceeds from operation 304, to operation 320. At operation 320, the routine 300 returns to operation 206, described above with regard to FIG. 2.

If, at operation 302, the software testing service 104 determines that the number of test instances 124 to utilize for testing is not specified in the testing preferences 112, the routine 300 proceeds from operation 302 to operation 306. At operation 306, the software testing service 104 determines whether the testing preferences 114 specify the maximum execution time for the tests 112. If the testing preferences 114 do not specify the number of test instances 124 or the maximum testing time, the routine 300 proceeds from operation 306 to operation 308, where a default number of test instances 124 can be utilized. When a default number of test instances 124 are utilized, the number of test instances 124 can be dynamically increased and/or decreased in the manner described below with regard to FIG. 5. In this way, the software developer 106 can be freed from having to specify a number of test instances 124 or the maximum execution time.

If, at operation 306, the software testing service 104 determines that the testing preferences 114 do specify a maximum execution time for the tests 112, the routine 300 proceeds from operation 306 to operation 310. At operation 310, the software testing service 104 determines whether historical test execution time data 126 is available for the tests 112 to be performed. If so, the routine 300 proceeds from operation 310 to operation 312.

At operation 312, the software testing service 104 computes an estimate of the time to complete the tests 112 based upon the historical test execution time data 126 for the tests 112. As discussed above, in one particular configuration a window of N executions of a test 112 might be utilized, and the execution times for more recent executions of the test 112 will be assigned a higher weight than older executions. Other mechanisms might also be utilized to compute an estimate of the execution time for the tests 112 based upon previous executions of the same tests 112.

From operation 312, the routine 300 proceeds to operation 314, where the estimate of the execution time computed at operation 312 is utilized to compute the number of test instances 124 need to perform the requested tests 112 within the maximum execution time specified in the testing preferences 114. For example, and without limitation, if the software testing service 104 determines that the tests 112 will take three hours to complete, the software testing service 104 will compute the number of instances 124 required to complete the tests 112 in three hours if executed in parallel. Once the number of instances 124 has been computed at operation 314, processing returns to operation 206, described above with regard to FIG. 2.

If, at operation 310, the software testing service 104 determines that historical test execution time data 126 is not available for the tests 112 to be executed, the routine 300 proceeds from operation 310 to operation 316. At operation 316, the software testing service 104 determines whether historical test execution time data 126 exists for tests 112 that are similar to the tests 112 to be executed. As discussed above, similar tests can include, but are not limited to, tests 112 in the same class, archive, or package. If historical test execution time data 126 exists for similar tests 112, the routine 300 proceeds from operation 316 to operation 318. If not, the routine 300 proceeds from operation 316 to operation 308, where a default number of test instances 124 can be utilized.

At operation 318, the software testing service 104 utilizes the historical test execution time data 126 for the similar tests 112 to compute an estimate of the time to complete the requested tests 112. As discussed above, in some configurations historical execution times for tests 112 in the same class as a requested tests 112 might be given a greater weight than a test 112 in the same package. Similarly, historical execution times for tests 112 in the same package might be assigned a greater weight than the historical execution times of tests 112 in the same archive. In this manner, the historical execution times for other tests 112 can be assigned a weight that is based upon their relevance to the tests 112 to be performed. Other mechanisms can also be utilized to estimate the time to complete the tests 112 from historical execution times of other tests. From operation 318, the routine 300 proceeds to operation 314, where the number of test instances 124 to utilize can be computed based upon the estimated completion time computed at operation 318. Processing then proceeds from operation 314 to operation 206, described above with regard to FIG. 2.

Figure 4:
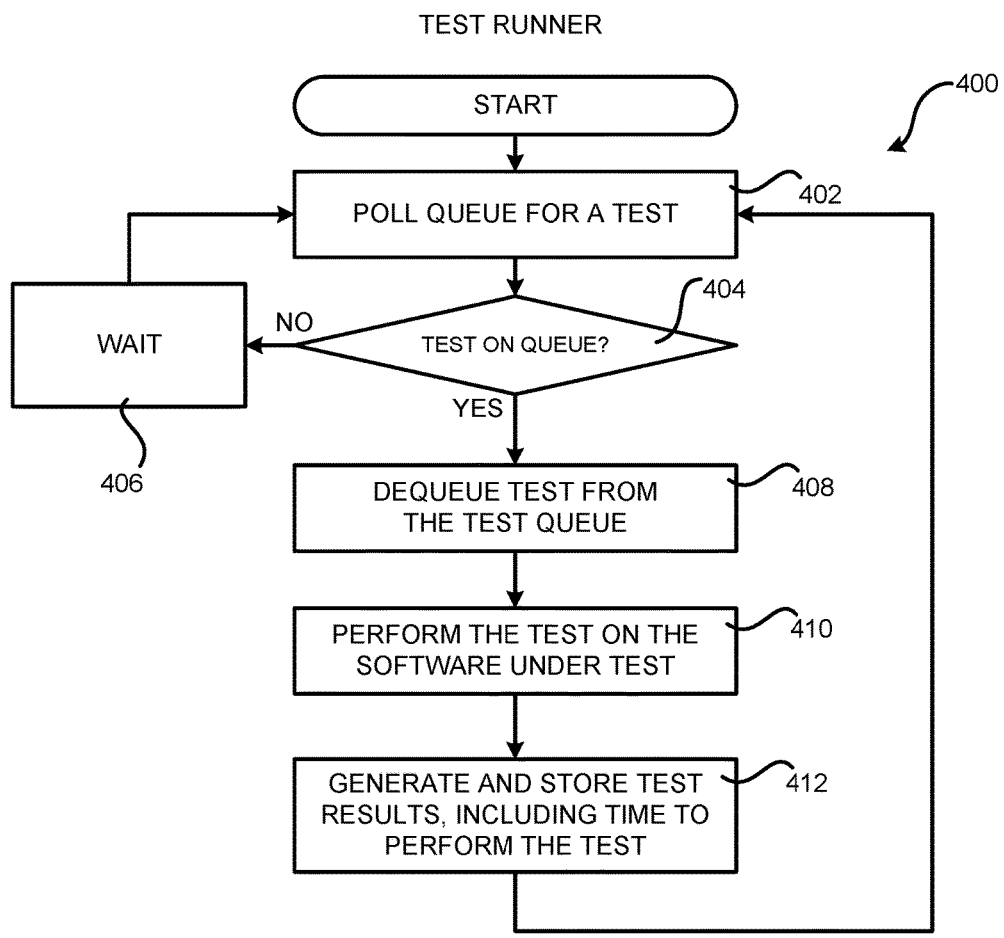
FIG. 4 is a flow diagram showing a routine that illustrates aspects of the operation of the test runner illustrated in FIG. 1, according to one particular configuration disclosed herein.

FIG. 4 is a flow diagram showing a routine 400 that illustrates aspects of the operation of the test runner 126 illustrated in FIG. 1, according to one particular configuration disclosed herein. The routine 400 begins at operation 402, where the test runner 126 executing on a test instance 124 polls the queue 118 for a test 112. If the queue 118 does not contain any tests 112, the routine 400 proceeds to operation 406, where the test runner 126 may wait a specified period of time before again polling the queue 118. If a test 112 is present on the queue 118, the routine 400 proceeds from operation 404 to operation 408.

At operation 408, the test runner 126 dequeues a test 112 from the test queue 118. The routine 400 then proceeds to operation 410, where the test runner 126 performs the dequeued test 112 on the software 116 under test. As discussed briefly above, the test 112 can be a unit test, an integration test, a performance test, or another type of software test. Once the test 112 has been performed, the routine 400 proceeds to operation 412, where the test runner 126 generates a test result 128 for the test 112, including data indicating the time required to perform the test 112. From operation 412, the routine 400 proceeds back to operation 402, where another test 112 can be dequeued and performed in the manner described above.

Figure 5:
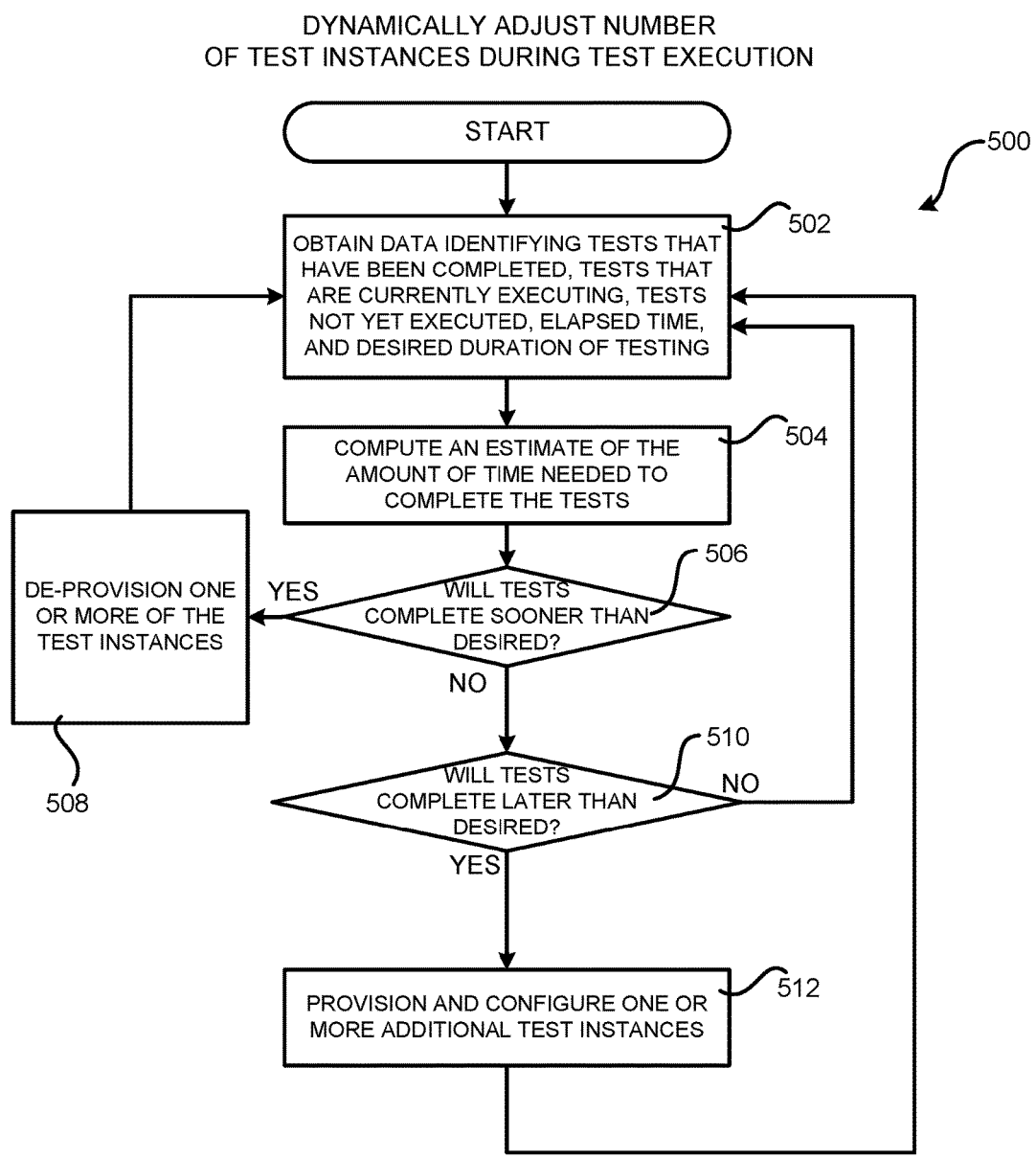
FIG. 5 is a flow diagram showing a routine that illustrates aspects of the operation of the software testing service shown in FIG. 1 for dynamically adjusting the number of test instances used for testing during test execution, according to one particular configuration disclosed herein.

FIG. 5 is a flow diagram showing a routine 500 that illustrates aspects of the operation of the software testing service 104 shown in FIG. 1 for dynamically adjusting the number of test instances 124 used for testing during test execution, according to one particular configuration disclosed herein. The routine 500 begins at operation 502, where the software testing service 104 obtains data identifying the tests 112 that have been completed, the tests 112 that are currently executing, the tests 112 that have not yet executed, the elapsed time since execution of the tests 112 started, and a desired duration for completion of the tests 112. As mentioned above, the test request 110 can specify the desired duration.

From operation 502, the routine 500 proceeds to operation 504, where the software testing service 104 utilizes the data identifying the tests 112 that have been completed, the tests 112 that are currently executing, the tests 112 that have not yet executed, the elapsed time since execution of the tests 112 started, and the historical test execution time data 126 to compute an estimate of the amount of time need to complete all of the requested tests 112. Once this value has been computed, the routine 500 proceeds from operation 504 to operation 506.

At operation 506, the software testing service 104 determines whether the estimated amount of time to complete all of the tests 112 is less than the desired testing duration (i.e. that the tests 112 will complete sooner than desired). If the tests 112 will complete sooner than desired, the routine 500 proceeds from operation 506 to operation 508. At operation 508, the software testing service 104 can cause one or more of the test instances 124 to be de-provisioned. For example, the software testing service 104 can instruct the on-demand computing service 122 to de-provision one or more of the test instances 124. By reducing the number of test instances 124 in this manner, the amount of time to perform the requested tests 112 can be increased so that the total amount of time to perform all of the tests 112 is approximately the desired duration.

If, at operation 506, the software testing service 104 determines that the tests 112 will not complete sooner than desired, the routine 500 proceeds to operation 510. At operation 510, the software testing service 104 determines whether the estimated amount of time to complete all of the tests 112 is greater than the desired testing duration (i.e. that the tests 112 will complete later than desired). If the tests 112 will not complete sooner or later than desired, the routine 500 proceeds back to operation 502, where the process described above can be repeated. If, however, performance of the tests 112 will complete later than desired, the routine 500 proceeds from operation 510 to operation 512.

At operation 512, the software testing service 104 can cause one or more additional test instances 124 to be provisioned. For example, the software testing service 104 can instruct the on-demand computing service 122 to provision one or more additional test instances 124. By increasing the number of test instances 124 in this manner, the amount of time to perform the requested tests 112 can be reduced so that the total amount of time to perform all of the tests 112 is approximately the desired duration. From operation 512, the routine 500 proceeds back to operation 502, where the process described above can be repeated.

Figure 6:
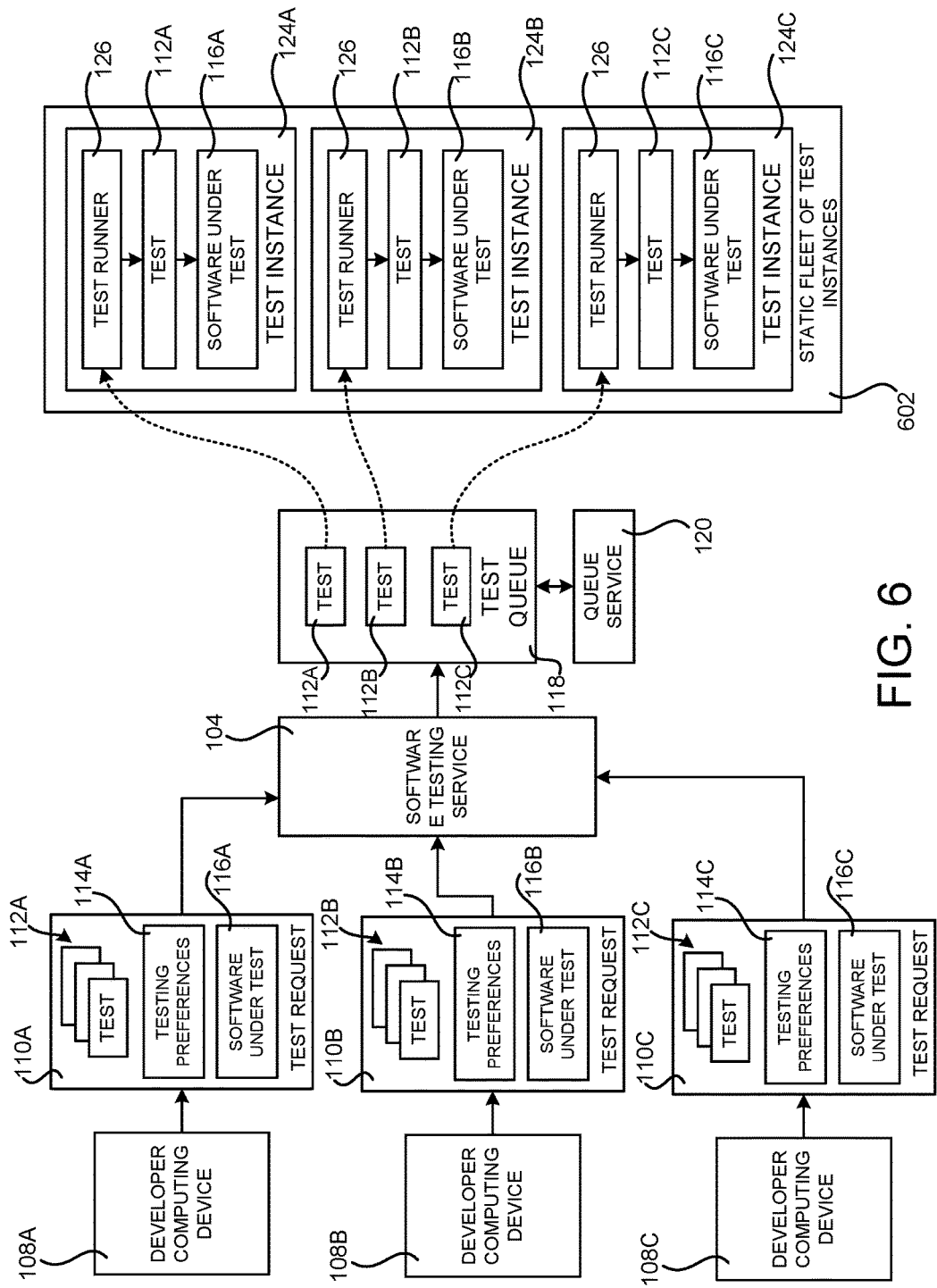
FIG. 6 is a system architecture diagram showing another configuration of the software testing service in which tests for multiple clients of the software testing service are distributed to a shared static fleet of test instances.

FIG. 6 is a system architecture diagram showing another configuration of the software testing service 104 in which tests 112 for multiple clients of the software testing service 104 are distributed to a shared static fleet 602 of test instances 124. As shown in FIG. 6 and described briefly above, the software testing service 104 can be configured to operate in conjunction with a static fleet 602 of test instances 124. In this configuration, the number of available test instances 124 is fixed and cannot be modified dynamically as in the configuration described above.

Additionally, in this configuration the software testing service 104 can be configured to distribute tests 112 for multiple different service clients (e.g. customers) to the fixed number of test instances 112. For example, and without limitation, the software testing service 104 might receive a request 110A from a developer computing device 108A to perform tests 112A on software under test 116A, a request 110B from a developer computing device 108B to perform tests 112B on software under test 116B, and a request 110C from a developer computing device 108C to perform tests 112A on software under test 116C. Additionally, each of the test requests 110 might specify separate testing preferences 114. For instance, the testing preferences 114A might request that the tests 112A be performed within a specified amount of time. Similarly, the testing preferences 114B and 114C might specify that the tests 112B and 112C be performed in different amounts of time, respectively.

Utilizing one or more heuristics, the software testing service 104 can select a subset of the tests 112 for each of the requesting service clients. For example, the software testing service 104 can select a subset of the tests 112A, 112B, and 112C. The selected subsets of the tests 112 can then be made available to a test runner 126 executing on the test instances 124 in the static fleet using a queue 118 as in the configuration described above.

Once the subsets of the tests 112 placed on the queue 118 have been completed, the software testing service 104 can utilize the heuristics select another subset of the tests 112 to be performed (e.g. the tests 112A, 112B, and 112C in FIG. 6), which are then made available to the test runners 126 and performed on the software 116 under test in the same manner. This process can continue until no further tests 112 remain to be performed for any of the requesting clients.

The heuristics utilized by the software testing service 104 to select subsets of the tests 112 requested by different service clients for performance on the software 116 under test using a static fleet 602 of test instances 124 can include, but are not limited to, a priority associated with each of the tests 112, a desired completion time for the tests 112, and an estimated time for completion of the tests 112. Other heuristics might also or alternately be utilized in other configurations.

Using some or all of the heuristics described above, the software testing service 104 can make a best attempt to satisfy the various execution times or other priorities requested by the different service clients. For example, using this mechanism tests 112 having a higher priority can be given preferential treatment in the test queue 118. Similarly, the priority values can be utilized to resolve conflicts between test requests submitted by different service clients. Tests 112 having shorter execution times or other attributes might also be given preferential treatment in other configurations. Additional details regarding the configuration of the software testing service 104 shown in FIG. 6 are provided below with regard to FIG. 7.

Figure 7:
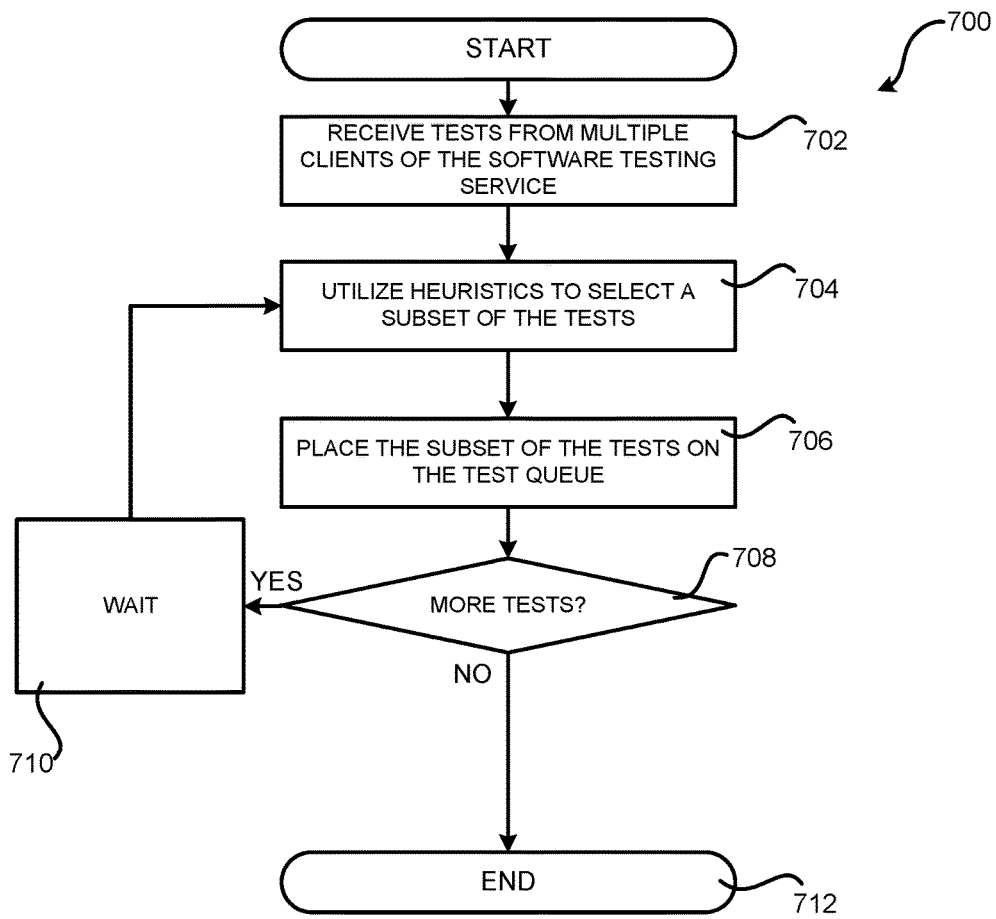
FIG. 7 is a flow diagram showing a routine that illustrates aspects of the operation of the software testing service for distribution of tests for multiple clients to a shared static fleet of test instances.

FIG. 7 is a flow diagram showing a routine 700 that illustrates aspects of the operation of the software testing service 104 for distribution of tests 126 for multiple clients to a shared static fleet 602 of test instances 124. The routine 700 begins at operation 702, where the software testing service 104 receives tests from multiple service clients. For example, and as shown in FIG. 6, the software testing service 104 can receive tests 112A, 112B, and 112C from multiple developer computing devices 108A, 108B, and 108C, respectively. Each of the received tests 112 can have an associated software 116 under test (e.g. the software under test 116A, 116B, and 116C). Each of the received tests 112 can also have associated testing preferences 114 (e.g. the testing preferences 114A, 114B, and 114C).

From operation 702, the routine 700 proceeds to operation 704, where the software testing service 104 can utilize various heuristics to select subsets of the requested tests 112. For instance, in the example shown in FIG. 6, the software testing service 104 can utilize the heuristics to select a subset of the tests 112A, 112B, and 112C to place on the test queue 118. As discussed above, the heuristics utilized by the software testing service 104 to select subsets of the tests 112 requested by different service clients for performance on the software 116 under test using a static fleet 602 of test instances 124 can include, but are not limited to, a priority associated with each of the tests 112, a desired completion time for the tests 112, and an estimated time for completion of the tests 112. Other heuristics might also or alternately be utilized in other configurations. Using some or all of these heuristics, the software testing service 104 can make a best attempt to satisfy the various execution times or other priorities requested by the different service clients in the testing preferences 114.

From operation 704, the routine 700 proceeds to operation 706, where the software testing service 104 places the subsets of the tests 112 selected at operation 704 on the test queue 118. As in the configurations described above, the test runner 126 executing on the test instances 124 in the static fleet 602 can dequeue the tests 112 and perform the tests on the various software 116 under test.

From operation 706, the routine 700 proceeds to operation 708, where the software testing service 104 determines if more tests 112 remain to be executed. If so, the routine 700 proceeds from operation 708 to operation 710, where the software testing service 104 may wait for a period of time (e.g. one minute) prior to selecting the next subset of the requested tests 112.

Once the period of time has elapsed, the routine 700 proceeds from operation 710 to operation 704, where additional tests 112 can be processed in the manner described above. This process can continue until no further tests 112 remain to be performed for any of the requesting clients. Once no further tests 112 remain to be performed, the routine 700 proceeds from operation 708 to operation 712, where it ends.

Figure 8:
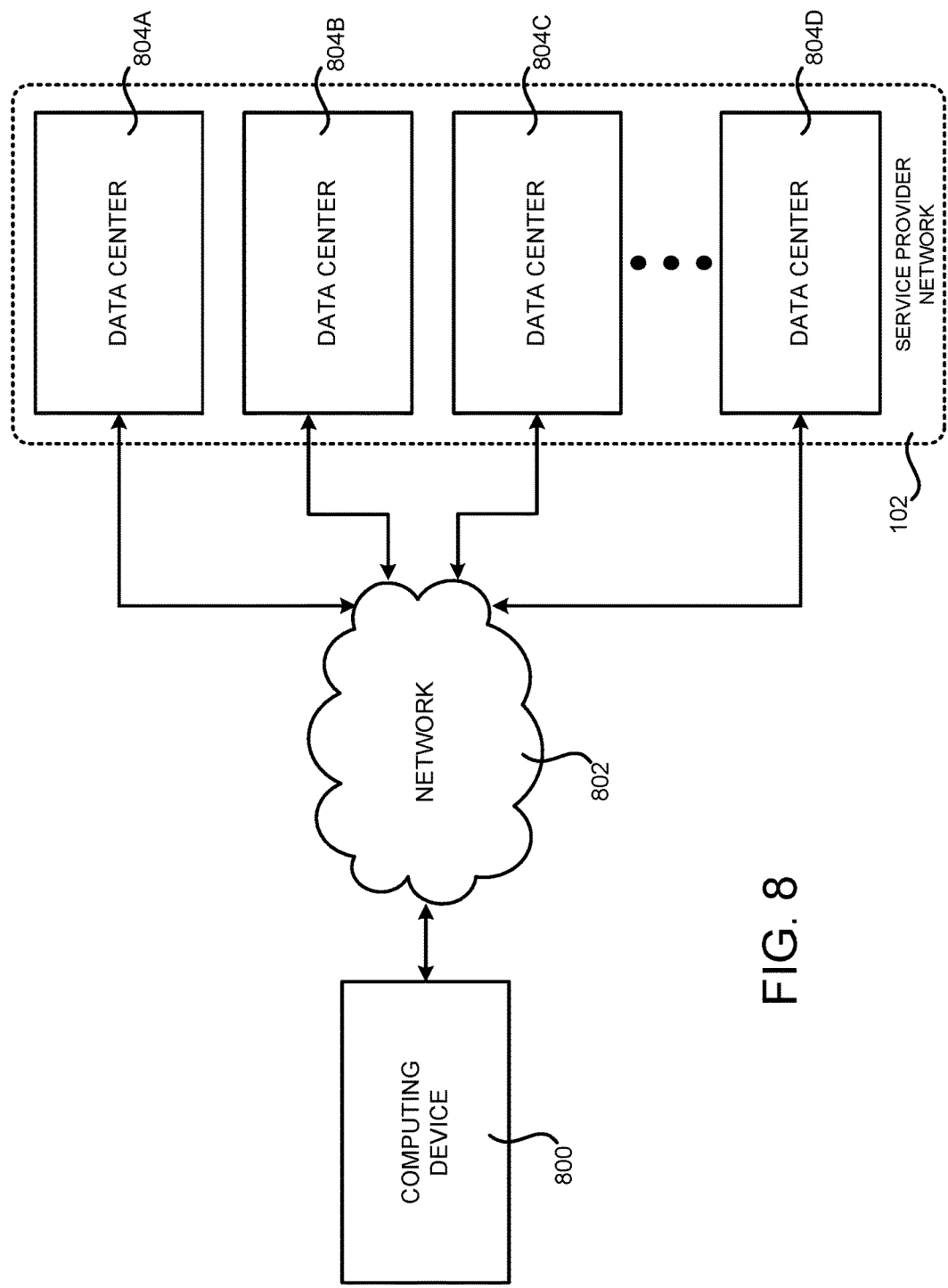
FIG. 8 is a system and network diagram that shows an illustrative operating environment that includes a service provider network that can be configured to implement aspects of the functionality described herein.

FIG. 8 is a system and network diagram that shows one illustrative operating environment for the configurations disclosed herein that includes a service provider network 102 that can be configured to provide functionality for distributed software testing in the manner described above, according to one configuration disclosed herein. As discussed above, the service provider network 102 can execute network services that provide computing resources on a permanent or an as-needed basis. Among other types of functionality, the computing resources provided by the service provider network 102 can be utilized to implement the various services described herein. As also discussed above, the computing resources provided by the service provider network 102 can include various types of computing resources, such as data processing resources like VM instances, data storage resources, networking resources, data communication resources, network services, and the like.

Each type of computing resource provided by the service provider network 102 can be general-purpose or can be available in a number of specific configurations. For example, data processing resources can be available as physical computers or VM instances in a number of different configurations. The VM instances can be configured to execute applications, including Web servers, application servers, media servers, database servers, some or all of the services described above, and/or other types of software. Data storage resources can include file storage devices, block storage devices, and the like. The service provider network 102 might also be configured to provide other types of computing resources not mentioned specifically herein.

As also discussed above, the computing resources 108 provided by the service provider network 102 are enabled in one implementation by one or more data centers 804A-804D (which might be referred herein singularly as "a data center 804" or in the plural as "the data centers 804"). The data centers 804 are facilities utilized to house and operate computer systems and associated components. The data centers 804 typically include redundant and backup power, communications, cooling, and security systems. The data centers 804 can also be located in geographically disparate locations. One illustrative configuration for a data center 804 that might be utilized to implement the technologies disclosed herein will be described below with regard to FIG. 9.

The customers and other users of the service provider network 102 can access the computing resources provided by the service provider network 102 over a network 802, which can be a wide area communication network ("WAN"), such as the Internet, an intranet or an Internet service provider ("ISP") network or a combination of such networks. For example, and without limitation, a computing device 800 operated by a customer or other user of the service provider network 102, such as the developer computing device 108, might be utilized to access the service provider network 102 by way of the network 802. It should be appreciated that a local-area network ("LAN"), the Internet, or any other networking topology known in the art that connects the data centers 804 to remote customers and other users can be utilized. It should also be appreciated that combinations of such networks might also be utilized.

Figure 9:
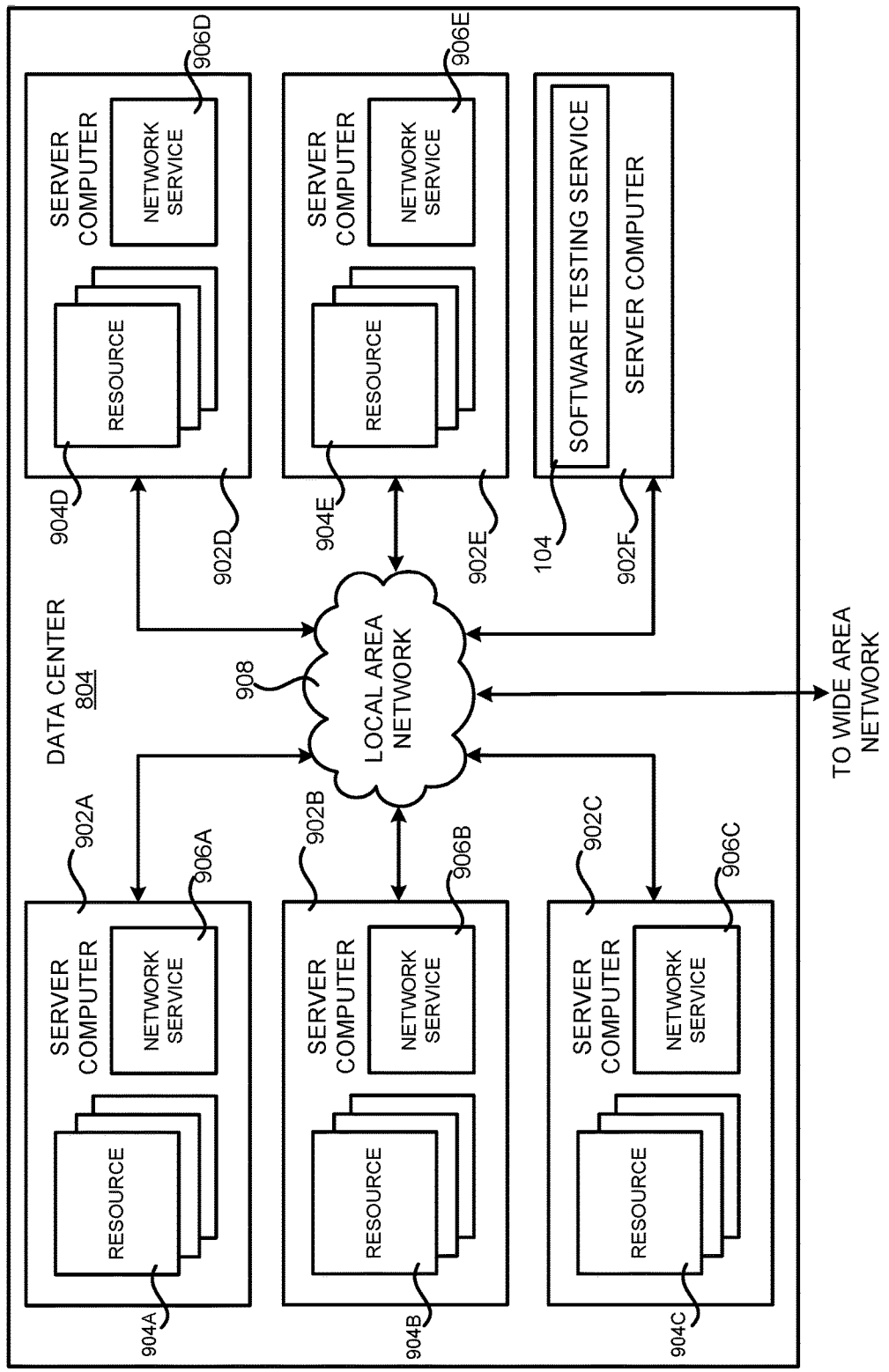
FIG. 9 is a computing system diagram illustrating a configuration for a data center that can be utilized to implement aspects of the technologies disclosed herein.

FIG. 9 is a computing system diagram that illustrates one configuration for a data center 804 that implements aspects of the technologies disclosed herein for distributed software testing. The example data center 804 shown in FIG. 9 includes several server computers 902A-902F (which might be referred to herein singularly as "a server computer 902" or in the plural as "the server computers 902") for providing the computing resources 904A-904E.

The server computers 902 can be standard tower, rack-mount, or blade server computers configured appropriately for providing the computing resources 904 described herein (illustrated in FIG. 9 as the computing resources 904A-904E). As mentioned above, the computing resources 904 provided by the service provider network 102 might be data processing resources such as VM instances or hardware computing systems, data storage resources, database resources, networking resources, and others. Some of the servers 902 might also be configured to execute network services 906A-906E, respectively, capable of instantiating, providing and/or managing the computing resources 904, some of which are described in detail below with regard to FIG. 10.

The data center 804 shown in FIG. 9 also includes a server computer 902F that can execute some or all of the software components described above. For example, and without limitation, the server computer 902F might be configured to execute the software testing service 104, which was described in detail above. The server computer 902F might also be configured to execute other components and/or to store data for providing some or all of the functionality described herein. In this regard, it should be appreciated that the software testing service 104 might execute on many other physical or virtual servers in the data centers 804 in various configurations.

In the example data center 804 shown in FIG. 9, an appropriate LAN 908 is also utilized to interconnect the server computers 902A-902F. The LAN 908 is also connected to the network 802 illustrated in FIG. 8. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components might also be utilized for balancing a load between each of the data centers 804A-804D, between each of the server computers 902A-902F in each data center 804, and, potentially, between computing resources 904 in each of the data centers 804. It should be appreciated that the configuration of the data center 804 described with reference to FIG. 9 is merely illustrative and that other implementations might be utilized.

Figure 10:
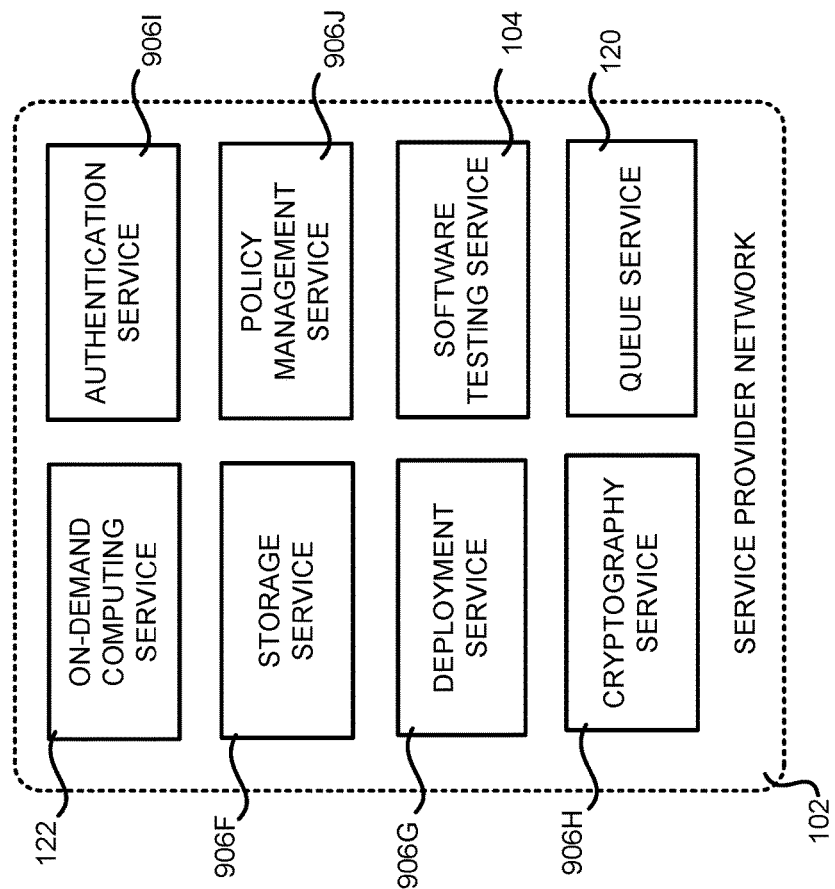
FIG. 10 is a system and network diagram that shows aspects of several services that might be provided by and utilized within a service provider network in one configuration disclosed herein.

FIG. 10 is a system and network diagram that shows aspects of several network services that might be provided by and utilized within a service provider network 102 in one configuration disclosed herein. In particular, and as discussed above, the service provider network 102 can provide a variety of network services to customers and other users of the service provider network 102 including, but not limited to, the software testing service 104, the queue service 120, and the on-demand computing service 122. The service provider network 102 might also provide other types of services including, but not limited to, a storage service 906F, a deployment service 906G, a cryptography service 906H, an authentication service 906I, and/or a policy management service 906I, each of which is described in greater detail below. Additionally, the service provider network 102 might also provide other services, some of which are described in greater detail below.

It should be appreciated that customers of the service provider network 102 can include organizations or individuals that utilize some or all of the services provided by the service provider network 102. As described above, a customer or other user can communicate with the service provider network 102 through a network, such as the network 802 shown in FIG. 8. Communications from a customer computing device, such as the developer computing device 108 shown in FIG. 1, to the service provider network 102 can cause the services provided by the service provider network 102 to operate in accordance with the described configurations or variations thereof.

It is noted that not all configurations described include the services described with reference to FIG. 10 and that additional network services can be provided in addition to or as an alternative to the services explicitly described herein. Each of the services shown in FIG. 10 might also expose Web service interfaces that enable a caller to submit appropriately configured application programming interface ("API") calls to the various services through Web service requests. In addition, each of the services might include service interfaces that enable the services to access each other (e.g., to enable a virtual computer system provided by the on-demand computing service 122 to store data in or retrieve data from the data storage service 906F). Additional details regarding some of the services shown in FIG. 10 will now be provided.

As discussed above, the on-demand computing service 122 can be a collection of computing resources configured to instantiate VM instances and to provide other types of computing resources 904 on demand. For example, a customer or other user of the service provider network 102 can interact with the on-demand computing service 122 (via appropriately configured and authenticated API calls) to provision and operate VM instances that are instantiated on physical computing devices hosted and operated by the service provider network 102. The VM instances can be used for various purposes, such as to operate as servers supporting a Web site, to operate business applications or, generally, to serve as computing resources for the customer. Other applications for the VM instances can be to support database applications, electronic commerce applications, business applications and/or other applications. Although the on-demand computing service 122 is shown in FIG. 10, any other computer system or computer system service can be utilized in the service provider network 102, such as a computer system or computer system service that does not employ virtualization and instead provisions computing resources on dedicated or shared computers/servers and/or other physical devices.

The storage service 906F might include software and computing resources that collectively operate to store data using block or file-level storage devices (and/or virtualizations thereof). The storage devices of the storage service 906F might, for instance, be operationally attached to virtual computer systems provided by the on-demand computing service 122 to serve as logical units (e.g., virtual drives) for the computer systems. A storage device might also enable the persistent storage of data used/generated by a corresponding virtual computer system where the virtual computer system service might only provide ephemeral data storage.

The service provider network 102 can also include a cryptography service 906H. The cryptography service 906H can utilize storage services of the service provider network 102, such as the storage service 906F, to store encryption keys in encrypted form, whereby the keys can be usable to decrypt customer keys accessible only to particular devices of the cryptography service 906H. The cryptography service 906H might also provide other types of functionality not specifically mentioned herein.

As illustrated in FIG. 10, the service provider network 102, in various configurations, also includes an authentication service 906I and a policy management service 906J. The authentication service 906I, in one example, is a computer system (i.e., collection of computing resources 904) configured to perform operations involved in authentication of users. For instance, one of the services shown in FIG. 10 can provide information from a user to the authentication service 906I to receive information in return that indicates whether or not the requests submitted by the user are authentic.

The policy management service 906I, in one example, is a network service configured to manage policies on behalf of customers or internal users of the service provider network 102. The policy management service 906I can include an interface that enables customers to submit requests related to the management of policy. Such requests can, for instance, be requests to add, delete, change or otherwise modify policy for a customer, service, or system, or for other administrative actions, such as providing an inventory of existing policies and the like.

The service provider network 102 can additionally maintain other services based, at least in part, on the needs of its customers. For instance, the service provider network 102 can maintain a deployment service 906G for deploying software and/or a database service (not shown in FIG. 10) in some configurations. A database service can be a collection of computing resources that collectively operate to create, maintain, and allow queries to be performed on databases stored within the service provider network 102. For example, a customer or other user of the service provider network 102 can operate and manage a database from the database service by utilizing appropriately configured network API calls. This, in turn, can allow the customer to maintain and potentially scale the operations in the database. Other services include object-level archival data storage services, and services that manage, monitor, interact with, or support other services. The service provider network 102 might also be configured with other network services not specifically mentioned herein in other configurations.

Figure 11:
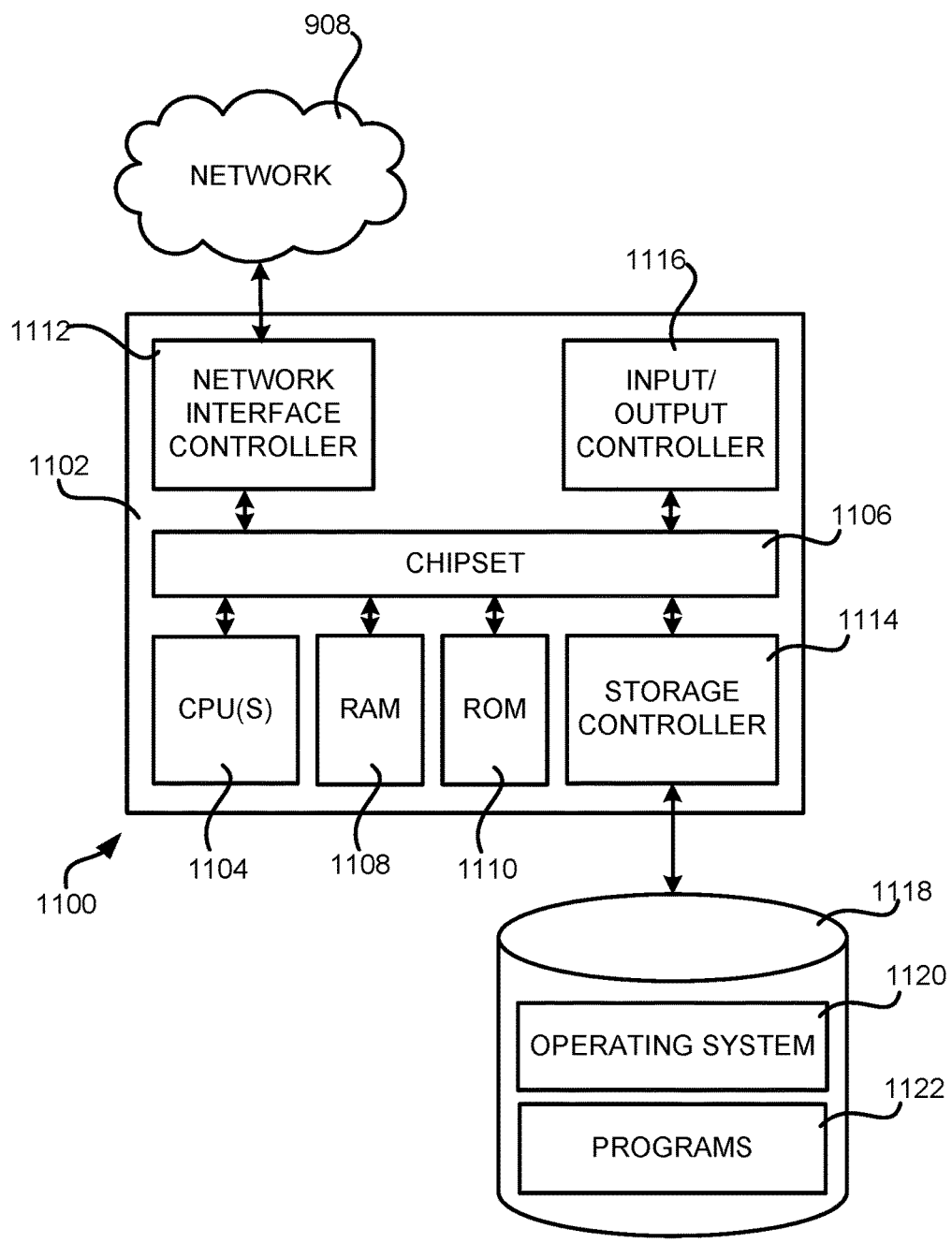
FIG. 11 is a computer architecture diagram showing an illustrative computer hardware architecture for implementing a computing device that might be utilized to implement aspects of the various technologies presented herein.

FIG. 11 shows an example computer architecture for a computer 1100 capable of executing software components for implementing the functionality described above. The computer architecture shown in FIG. 11 illustrates a conventional server computer, workstation, desktop computer, laptop, tablet, network appliance, e-reader, smartphone, or other computing device, and can be utilized to execute any of the software components presented herein.

The computer 1100 includes a baseboard 1102, or "motherboard," which is a printed circuit board to which a multitude of components or devices can be connected by way of a system bus or other electrical communication paths. In one illustrative configuration, one or more central processing units ("CPUs") 1104 operate in conjunction with a chipset 1106. The CPUs 1104 can be standard programmable processors that perform arithmetic and logical operations necessary for the operation of the computer 1100.

The CPUs 1104 perform operations by transitioning from one discrete, physical state to the next through the manipulation of switching elements that differentiate between and change these states. Switching elements can generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 1106 provides an interface between the CPUs 1104 and the remainder of the components and devices on the baseboard 1102. The chipset 1106 can provide an interface to a RAM 1108, used as the main memory in the computer 1100. The chipset 1106 can further provide an interface to a computer-readable storage medium such as a read-only memory ("ROM") 1110 or non-volatile RAM ("NVRAM") for storing basic routines that help to startup the computer 1100 and to transfer information between the various components and devices. The ROM 1110 or NVRAM can also store other software components necessary for the operation of the computer 1100 in accordance with the configurations described herein.

The computer 1100 can operate in a networked environment using logical connections to remote computing devices and computer systems through a network, such as the network 908. The chipset 1106 can include functionality for providing network connectivity through a NIC 1112, such as a gigabit Ethernet adapter. The NIC 1112 is capable of connecting the computer 1100 to other computing devices over the network 908. It should be appreciated that multiple NICs 1112 can be present in the computer 1100, connecting the computer to other types of networks and remote computer systems.

The computer 1100 can be connected to a mass storage device 1118 that provides non-volatile storage for the computer. The mass storage device 1118 can store an operating system 1120, programs 1122, and data, which have been described in greater detail herein. The mass storage device 1118 can be connected to the computer 1100 through a storage controller 1114 connected to the chipset 1106. The mass storage device 1118 can consist of one or more physical storage units. The storage controller 1114 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 1100 can store data on the mass storage device 1118 by transforming the physical state of the physical storage units to reflect the information being stored. The specific transformation of physical state can depend on various factors, in different implementations of this description. Examples of such factors can include, but are not limited to, the technology used to implement the physical storage units, whether the mass storage device 1118 is characterized as primary or secondary storage, and the like.

For example, the computer 1100 can store information to the mass storage device 1118 by issuing instructions through the storage controller 1114 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1100 can further read information from the mass storage device 1118 by detecting the physical states or characteristics of one or more particular locations within the physical storage units.

In addition to the mass storage device 1118 described above, the computer 1100 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 1100.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the mass storage device 1118 can store an operating system 1120 utilized to control the operation of the computer 1100. According to one configuration, the operating system comprises the LINUX operating system. According to another configuration, the operating system comprises the WINDOWS® SERVER operating system from MICROSOFT Corporation. According to further configurations, the operating system can comprise the UNIX operating system or one of its variants. It should be appreciated that other operating systems can also be utilized. The mass storage device 1118 can store other system or application programs and data utilized by the computer 1100.

In one configuration, the mass storage device 1118 or other computer-readable storage media is encoded with computer-executable instructions which, when loaded into the computer 1100, transform the computer from a general-purpose computing system into a special-purpose computer capable of implementing the configurations described herein. These computer-executable instructions transform the computer 1100 by specifying how the CPUs 1104 transition between states, as described above. According to one configuration, the computer 1100 has access to computer-readable storage media storing computer-executable instructions which, when executed by the computer 1100, perform the various processes described above with regard to FIGS. 1-7. The computer 1100 might also include computer-readable storage media for performing any of the other computer-implemented operations described herein.

The computer 1100 can also include one or more input/output controllers 1116 for receiving and processing input from a number of input devices, such as a keyboard, a mouse, a touchpad, a touch screen, an electronic stylus, or other type of input device. Similarly, an input/output controller 1116 can provide output to a display, such as a computer monitor, a flat-panel display, a digital projector, a printer, a plotter, or other type of output device. It will be appreciated that the computer 1100 might not include all of the components shown in FIG. 11, can include other components that are not explicitly shown in FIG. 11, or might utilize an architecture completely different than that shown in FIG. 11.

Based on the foregoing, it should be appreciated that technologies for distributed software testing have been presented herein. Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and media are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes can be made to the subject matter described herein without following the example configurations and applications illustrated and described, and without departing from the true spirit and scope of the present invention, which is set forth in the following claims.

What is claimed is:

1. A system comprising:
one or more processors; and
one or more computer-readable media storing computer-executable instructions that, when executed by the one or more processors, cause the one or more processors perform acts comprising:
determining a period of time in which performance of multiple tests on software is to be completed;
determining a number of test instances to utilize to complete performance of the multiple tests on the software within the period of time, the number of test instances comprising a first test instance and a second test instance;
causing the first test instance and the second test instance to be provisioned to one or more network-based computing devices;
causing the software to be deployed to the first test instance and the second test instance;
causing a first test, of the multiple tests, to be performed on the software on the first test instance during a first portion of the period of time; and
causing a second test, of the multiple tests, to be performed on the software on the second test instance during a second portion of the period of time that at least partially overlaps with the first portion of the period of time.

2. The system of claim 1, the acts further comprising:
causing a test runner to be deployed to the first test instance and the second test instance; and
placing the multiple tests on a test queue associated with the one or more network-based computing devices,
wherein the test runner is configured to dequeue the multiple tests from the test queue and perform the multiple tests on the software on the number of test instances.

3. The system of claim 1, the acts further comprising receiving a request to perform the multiple tests on the software, and
wherein:
the request includes a test preference indicating the period of time; and
determining the number of test instances to utilize for performing the multiple tests on the software is based at least in part on the period of time and historical test execution time data corresponding to one or more tests of the multiple tests.

4. The system of claim 1, the acts further comprising:
determining that performance of the multiple tests on the software has completed;
determining an amount of time taken to perform one or more tests of the multiple tests; and
creating historical execution time data based at least in part on the amount of time taken to perform the one or more tests, the historical execution time data indicating previously measured amounts of time to perform the one or more tests.

5. The system of claim 1, the acts further comprising:
receiving a request to perform the multiple tests on the software, wherein the request includes an indication of the period of time in which performance of the multiple tests on the software is to be completed;
determining an estimated amount of time for completion of the multiple tests using the number of test instances;
determining that the estimated amount of time for completion of the multiple tests using the number of test instances is less than the period of time in which performance of the multiple tests on the software is to be completed; and
based at least in part on the estimated time for completion being less than the period of time, causing a test instance of the number of test instances to be de-provisioned.

6. A method for performing multiple tests on software, the method comprising:
determining a period of time in which performance of the multiple tests on the software is to be completed;
determining, based at least in part on historical execution time data, a number of test instances to utilize to complete performance of the multiple tests on the software within the period of time, wherein the historical execution time data indicates previously measured amounts of time to perform one or more tests of the multiple tests or tests similar to the one or more tests;
identifying a first test instance and a second test instance of the number of test instances provisioned on one or more network-based computing devices of a software execution system;

causing the software to be deployed to the first test instance and the second test instance;
causing a first test, of the multiple tests, to be performed on the software on the first test instance during a first portion of the period of time; and
causing a second test, of the multiple tests, to be performed on the software on the second test instance during a second portion of the period of time that at least partially overlaps with the first portion of the period of time.

7. The method of claim 6, further comprising, responsive to determining the number of test instances to utilize for performing the multiple tests on the software, causing the first test instance and the second test instance to be provisioned to the one or more network-based computing devices of the software execution system.

8. The method of claim 6, wherein determining the number of test instances to utilize for performing the multiple tests on the software comprises identifying a static set of test instances provisioned on the one or more network-based computing devices.

9. The method of claim 6, further comprising:
causing a test runner to be deployed to the first test instance and the second test instance; and
placing the multiple tests on a test queue associated with the one or more network-based computing devices,
wherein the test runner is configured to dequeue the multiple tests from the test queue and perform the multiple tests on the software on the number of test instances.

10. The method of claim 6, further comprising receiving a request to perform the multiple tests on the software, wherein:
the request includes a test preference indicating the period of time in which performance of the multiple tests on the software is to be completed; and
determining the number of test instances to utilize for performing the multiple tests on the software is based at least in part on historical execution time data corresponding to one or more tests of the multiple tests.

11. The method of claim 6, further comprising:
receiving a test preference indicting the period of time in which performance of the multiple tests on the software is to be completed;
determining an estimated amount of time for completion of the multiple tests using the number of test instances;
determining that the estimated amount of time for completion of the multiple tests using the number of test instances is less than the period of time; and
based at least in part on the estimated time for completion being less than the period of time, causing a test instance of the number of test instances to be de-provisioned.

12. The method of claim 6, further comprising:
receiving a test preference indicting the period of time in which performance of the multiple tests on the software is to be completed;
determining an estimated amount of time for completion of the multiple tests using the number of test instances;
determining that the estimated amount of time for completion of the multiple tests using the number of test instances is greater than the period of time; and
based at least in part on the estimated time for completion being less than the period of time, causing an additional test instance to be provisioned with the number of test instances on the one or more network-based computing devices of the software execution system.

13. The method of claim 6, further comprising:
receiving a test preference indicting the period of time in which performance of the multiple tests on the software is to be completed;
analyzing the historical execution time data indicating the previously measured amounts of time to perform at least one of:
the one or more tests on previous software; or
the tests similar to the one or more tests on previous software; and
determining, based at least in part on analyzing the historical execution time data, an estimated amount of time to perform the one or more tests,
wherein determining the number of test instances to utilize is based at least in part on the period of time and the estimated amount of time to perform the one or more tests.

14. The method of claim 13, further comprising:
determining that performance of the one or more tests on the software has completed;
determining an amount of time taken to perform the one or more tests; and
creating the historical execution time data based at least in part on amount of time taken to perform the one or more tests.

15. A system comprising:
one or more processors; and
one or more computer-readable media storing computer-readable instructions that, when executed by the one or more processors, cause the one or more processors to perform acts comprising:
determining a number of test instances to utilize for performing multiple tests on software, the number of test instances comprising a first test instance and a second test instance;
at least partly responsive to determining the number of test instances to utilize for performing the multiple tests on the software, causing the first test instance and the second test instance to be provisioned on one or more network-based computing devices;
causing the software to be deployed to the first test instance and the second test instance;
causing a first test, of the multiple tests, to be performed on the software on the first test instance during a first period of time; and
causing a second test, of the multiple tests, to be performed on the software on the second test instance during a second period of time that at least partially overlaps with the first period of time.

16. The system of claim 15, the acts further comprising:
identifying a first priority associated with the first test;
identifying a second priority associated with the second test, wherein the first priority is higher than the second priority, and
wherein causing the first test to be performed on the software is initiated before causing the second test to be performed on the software based at least in part on the first priority being higher than the second priority.

17. The system of claim 15, the acts further comprising:
determining that performance of the first test on the software has completed; and
causing a third test, of the multiple tests, to be performed on the software on the first test instance.

18. The system of claim 15, the acts further comprising:
causing a test runner to be deployed to the first test instance and the second test instance; and
placing the multiple tests on a test queue associated with the one or more network-based computing devices,
wherein the test runner is configured to dequeue the multiple tests from the test queue and perform the multiple tests on the software on the number of test instances.

19. The system of claim 18, wherein:
causing the first test to be performed on the software comprises placing the first test on the test queue such that the test runner dequeues the first test from the test queue and performs the first test on the software on the first test instance; and
causing the second test to be performed on the software comprises placing the second test on the test queue such that the test runner dequeues the second test from the test queue and performs the second test on the software on the second test instance.

20. The system of claim 15, the acts further comprising receiving, from a developer device associated with a developer of the software, a test preference indicating the number of test instances to utilize for performing the multiple tests on the software.

\* \* \* \* \*